United States Patent
Guo et al.

(10) Patent No.: US 10,986,001 B2
(45) Date of Patent: Apr. 20, 2021

(54) SYSTEM AND METHOD FOR QUALITY OF SERVICE DETECTION OF ENCRYPTED PACKET FLOWS

(71) Applicant: Nokia Solutions and Networks Oy, Espoo (FI)

(72) Inventors: Katherine H. Guo, Scotch Plains, NJ (US); Scott C. Miller, Freehold, NJ (US); Lesley Jen-Yuan Wu, Mountain Lakes, NJ (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 458 days.

(21) Appl. No.: 15/880,502

(22) Filed: Jan. 25, 2018

(65) Prior Publication Data

US 2019/0230010 A1 Jul. 25, 2019

(51) Int. Cl.
*H04L 12/26* (2006.01)
*H04L 29/06* (2006.01)
*H04L 29/08* (2006.01)

(52) U.S. Cl.
CPC .......... *H04L 43/04* (2013.01); *H04L 43/0894* (2013.01); *H04L 43/16* (2013.01); *H04L 65/4084* (2013.01); *H04L 65/80* (2013.01); *H04L 43/0888* (2013.01); *H04L 65/4069* (2013.01); *H04L 67/02* (2013.01)

(58) Field of Classification Search
CPC ..... H04L 43/04; H04L 43/0894; H04L 43/16; H04L 65/4084; H04L 65/80; H04L 65/4069; H04L 43/0888; H04L 67/02
See application file for complete search history.

(56) References Cited

U.S. PATENT DOCUMENTS

| 7,854,003 B1 * | 12/2010 | Strayer | H04L 63/1433 726/23 |
| 9,654,528 B1 | 5/2017 | Cho et al. | |
| 2008/0165795 A1 * | 7/2008 | Baruch | H04L 49/9063 370/421 |
| 2013/0170377 A1 * | 7/2013 | Hong | H04L 69/22 370/252 |

(Continued)

OTHER PUBLICATIONS

Wubin Pan, Gaung Cheng, Hua Wu and Yongning Tang, "Towards QoE assessment of encrypted YouTube adaptive video streaming in mobile networks," 2016 IEEE/ACM 24th International Symposium on Quality of Service (IWQoS), Beijing, 2016, pp. 1-6 (Year: 2016).*

(Continued)

*Primary Examiner* — David R Lazaro
(74) *Attorney, Agent, or Firm* — Loza & Loza, LLP; Jessica Smith

(57) ABSTRACT

A monitoring station deployed in a network monitors packets over one or more interfaces in the network. The monitoring station identifies a flow in a media session. The flow includes at least one request message that includes a request for a segment or chunk of video content and one or more response messages including the requested chunk. The monitoring determines a start of a chunk in the flow and determines an end of the chunk in the flow. Using the start and end times of the chunk and next or subsequent chunks, the monitoring station determines one or more chunk statistics, such as chunk size, chunk duration and chunk download time.

22 Claims, 18 Drawing Sheets

(56) References Cited

U.S. PATENT DOCUMENTS

| | | | | |
|---|---|---|---|---|
| 2013/0272121 | A1* | 10/2013 | Stanwood | H04L 47/824 370/230 |
| 2014/0052846 | A1* | 2/2014 | Scherkus | H04N 21/6581 709/224 |
| 2014/0222962 | A1 | 8/2014 | Mao et al. | |
| 2014/0241699 | A1* | 8/2014 | Honda | H04N 21/2401 386/248 |
| 2014/0310396 | A1* | 10/2014 | Christodorescu | H04L 41/142 709/224 |
| 2017/0093648 | A1* | 3/2017 | Elarabawy | H04L 41/5067 |
| 2017/0195393 | A1 | 7/2017 | Su et al. | |
| 2017/0195448 | A1* | 7/2017 | Su | H04L 65/4084 |
| 2017/0237777 | A1* | 8/2017 | Joch | H04L 63/062 713/152 |
| 2019/0158414 | A1* | 5/2019 | Navon | H04L 47/52 |
| 2019/0230010 | A1* | 7/2019 | Guo | H04L 65/4084 |
| 2020/0076779 | A1* | 3/2020 | Noble | H04L 9/0618 |
| 2020/0153805 | A1* | 5/2020 | Sen | H04L 63/0457 |

OTHER PUBLICATIONS

T. Mangla, E. Halepovic, M. Ammar and E. Zegura, "MIMIC: Using passive network measurements to estimate HTTP-based adaptive video QoE metrics," 2017 Network Traffic Measurement and Analysis Conference (TMA), Dublin, 2017, pp. 1-6 (Year: 2017).*

Giorgos Dimopoulos, Ilias Leontiadis, Pere Barlet-Ros, and Konstantina Papagiannaki. 2016. "Measuring Video QoE from Encrypted Traffic". In Proceedings of the 2016 Internet Measurement Conference (IMC '16) (Year: 2016).*

J. J Kua, G. G Armitage and P. Branch, "A Survey of Rate Adaptation Techniques for Dynamic Adaptive Streaming Over HTTP," in IEEE Communications Surveys & Tutorials, vol. 19, No. 3, pp. 1842-1866, thirdquarter 2017 (Year: 2017).*

T. Zhao, Q. Liu and C. W. Chen, "QoE in Video Transmission: A User Experience-Driven Strategy," in IEEE Communications Surveys & Tutorials, vol. 19, No. 1, pp. 285-302, Firstquarter 2017 (Year: 2017).*

H. Nam, K. Kim and H. Schulzrinne, "QoE matters more than QoS: Why people stop watching cat videos," IEEE INFOCOM 2016—The 35th Annual IEEE International Conference on Computer Communications, San Francisco, CA, 2016, pp. 1-9 (Year: 2016).*

Orsolic, I., Pevec, D., Suznjevic, M. et al. A machine learning approach to classifying YouTube QoE based on encrypted network traffic. Multimed Tools Appl 76, 22267-22301 (2017). (Year: 2017).*

P. Juluri, V. Tamarapalli and D. Medhi, "QoE management in Dash systems using the segment aware rate adaptation algorithm," NOMS 2016—2016 IEEE/IFIP Network Operations and Management Symposium, Istanbul, 2016, pp. 129-136 (Year: 2016).*

European Patent Appln. No. 19153388.4 Extended European Search Report dated Apr. 18, 2019.

Dimopoulos et al. "Measuring video Qoe from encrypted traffic." Proceedings of the 2016 ACM on Internet Measurement Conference, IMC 2016, Santa Monica, CA, USA, pp. 513-526 (Nov. 14-16, 2016).

Krishnamoorthi et al. "BUFFEST: predicting buffer conditions and real-time requirements of HTTP(S) adaptive streaming clients." Proceedings of the 8th ACM on Multimedia Systems Conference, MMSys 2017, Taipei, Taiwan, pp. 76-87 *Jun. 20-23, 2017).

Stockhammer, "Dynamic adaptive streaming over HTTP—design principles and standards." Proc. ACM Multimedia Systems (2011).

Mansy et al. "Characterizing client behavior of commercial mobile video streaming services." Proceedings of the 6th ACM Mobile Video Workshop, MoVid 2014, Singapore, pp. 8:1-8:6 (Mar. 19, 2014).

* cited by examiner

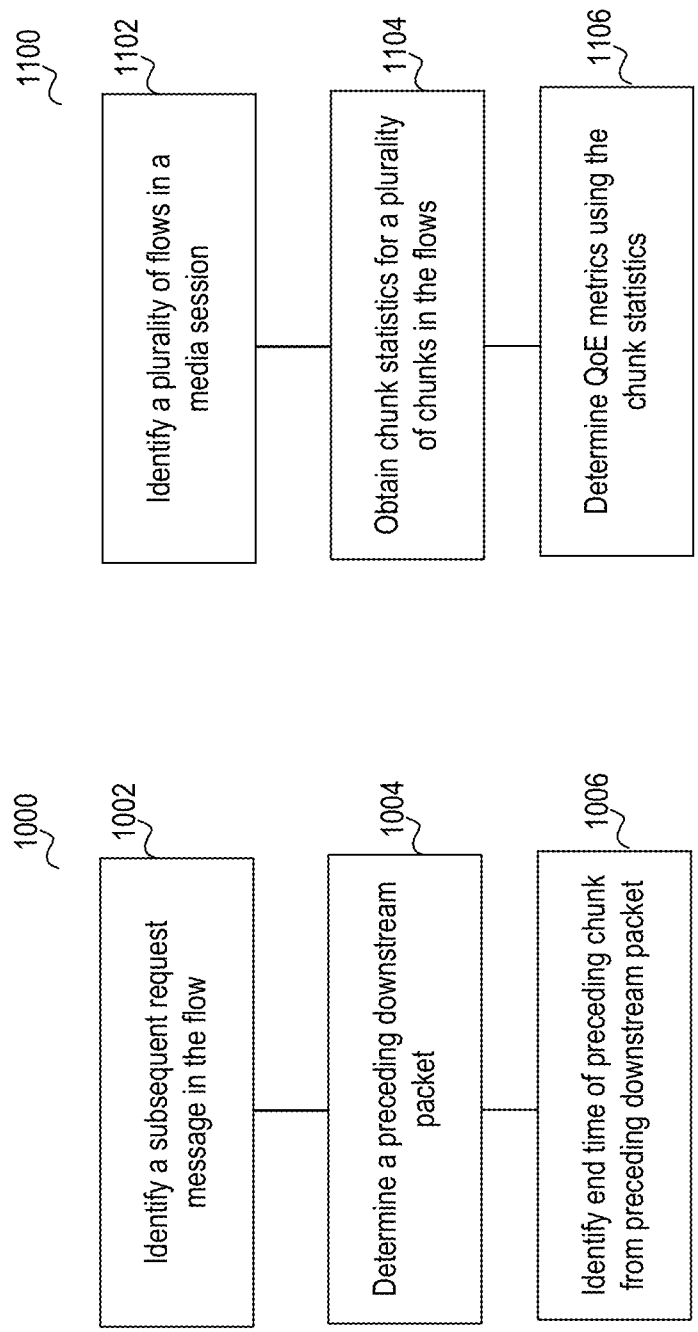

SYSTEM AND METHOD FOR QUALITY OF SERVICE DETECTION OF ENCRYPTED PACKET FLOWS

TECHNICAL FIELD

This application relates generally to quality of service detection in networks, and more specifically to quality of service detection of encrypted packet flows including multimedia traffic.

DESCRIPTION OF RELATED ART

The statements in this section provide a description of related art and are not admissions of prior art.

Video traffic is one of the more common types of traffic over the Internet today. Currently, video traffic may be delivered using Dynamic Adaptive Streaming over HTTP as described in ISO/IEC DIS 23009-1.2014, "Dynamic adaptive streaming over HTTP", May 2014 (MPEG-DASH). MPEG-DASH is an adaptive bitrate streaming technology where a multimedia file is partitioned into one or more segments and delivered to a client using Hyper Text Transfer Protocol (HTTP). MPEG-DASH works by breaking the multimedia file into a sequence of smaller file segments, each segment containing a short interval of playback time of the video content. The file segments may be provided at a plurality of different bit rates, i.e., the file segments are encoded at different bit rates.

While the content is being played back by an MPEG-DASH client, the client automatically selects from the alternative bit rates in which to download the next segment based on current network conditions. For example, the client may select the segment with the highest bit rate possible that can be downloaded in time for playback without causing stalls or re-buffering events in the playback. Thus, an MPEG-DASH client can seamlessly adapt to changing network conditions and provide high quality playback with fewer stalls or re-buffering events.

In wireless networks, DASH is defined in 3GPP Adaptive HTTP Streaming in 3GPP TS 26.247: "Transparent end-to-end packet switched streaming service (PSS); Progressive Download and Dynamic Adaptive Streaming over HTTP," Version 15 Sep. 22, 2017 (3GPP-DASH). Herein, DASH refers to MPEG-DASH or 3GPP-DASH or any other similar type standard wherein a video server divides a video asset into segments or chunks, and video clients request individual segments or chunks.

Traditional streaming generally uses a stateful protocol, e.g., the Real-Time Streaming Protocol (RTSP). In contrast to RSTP transport, the HTTP protocol is stateless. When an HTTP client requests some data, the server responds by sending the data and the transaction is terminated. Each HTTP request is handled as a completely standalone one-time transaction.

When HTTP is used in DASH, the HTTP message content is not encrypted and may be inspected by monitoring devices in the network. For example, service providers can examine the HTTP content to infer the behavior of a video client, and derive some indicators of Quality of Service (QoS) experienced by the video client.

However, Secure Hyper Text Transfer Protocol (HTTPS) is becoming a more common protocol in delivery of video content using DASH. HTTPS includes the Secure Sockets Layer (SSL), or its successor Transport Layer Security (TLS), a secure encryption protocol used to encrypt the HTTP messages. In HTTPS, the messages are encrypted. As a result, existing approaches for quality of service detection using packet inspection are not possible on encrypted video packets.

The HTTP protocol can also operate over QUIC (Quick UDP Internet Connections). QUIC is an experimental transport layer network protocol that supports a set of multiplexed connections between two endpoints over User Datagram Protocol (UDP). It was designed to provide security protection equivalent to TLS/SSL, along with forward error correction to provide reliability without using TCP.

Therefore, a need exists for an improved system and method for quality of service detection in encrypted packet flows of video content.

SUMMARY

In an embodiment, a method for determining one or more chunk statistics includes identifying a flow in a media session by a monitoring station. The method further includes determining a start of a chunk in the flow by the monitoring station and determining an end of a chunk in the flow by the monitoring station. The method further includes determining one or more chunk statistics from the start of the chunk and the end of the chunk in the flow.

In another embodiment, a method for determining one or more quality of experience (QoE) metrics for a media session includes identifying a plurality of flows in a media session by a monitoring station, identifying a plurality of chunks in each of the plurality of flows and determining one or more chunk statistics using the identified plurality of chunks by the monitoring station. The method further includes determining the one or more QoE metrics for the media session using one or more of the chunk statistics.

In still another embodiment, a method for determining a plurality of states in a media session includes identifying a plurality of flows in a media session by a monitoring station and identifying a plurality of chunks in each of the plurality of flows. The method further includes determining one or more chunk statistics using a start time and an end time for one or more of the plurality of chunks and determining a start time of a steady state in the media session using one or more of the chunk statistics.

In one or more embodiments above, the identifying the start of the chunk in the flow includes identifying packet sizes for a plurality of upstream packets in the flow and comparing the identified packet sizes to a size pattern, determining a first packet of the upstream packets in the flow compares favorably to the size pattern; and identifying the start of the chunk in response to an arrival time of the first packet at the monitoring station.

In one or more embodiments above, identifying a subsequent request message in the flow includes determining a preceding downsteam packet, wherein the preceding downstream packet precedes the subsequent request message and determining the end of the chunk in response to an arrival time of the preceding downstream message for the chunk at the monitoring station.

In one or more embodiments above, determining the one or more chunk statistics includes determining a chunk download time for the chunk, wherein the chunk download time is a difference in time from the start of the chunk and the end of the chunk or the arrival time of the last packet of the chunk; determining a chunk size for the chunk, wherein the chunk size is an amount of data transmitted downstream between the start of the chunk and the end of the chunk; and determining a chunk duration for the chunk, wherein the chunk duration is a difference in time from the start of the chunk and a start of the next chunk in the flow.

In one or more embodiments above, determining the one or more chunk statistics includes determining a chunk throughput for the chunk, wherein the chunk throughput is the chunk size of the chunk divided by the chunk duration of the chunk. The determining the one or more chunk statistics further includes determining a saturated chunk throughput for the chunk, wherein the saturated chuck throughput is the chunk size of the chunk divided by the chunk download time for the chunk.

In one or more embodiments above, the method further includes determining a session average throughput. The session average throughput is at least one of: a sum of the chunk throughput for a plurality of chunks in the media session and the number of the plurality of chunks; or a sum of a total size of the plurality of chunks in the media session divided by the duration of the plurality of chunks in the media session, wherein the duration of the plurality of chunks in the media session equates to a length of the media session.

In one or more embodiments above, the method further includes determining a session saturated throughput for the media session, wherein the session saturated throughput is one of: a sum of chunk sizes of the plurality of chunks in the media session divided by a sum of download time for the plurality of chunks or an average of chunk saturated throughput for the plurality of chunks in the session.

In one or more embodiments above, the method further includes determining a session throughput gap for the media session, wherein the session throughput gap is a difference between the session saturated throughput and the session average throughput.

BRIEF DESCRIPTION OF THE SEVERAL VIEWS OF THE DRAWINGS

Some embodiments of apparatus and/or methods in accordance with embodiments of the disclosure are now described, by way of example only, and with reference to the accompanying drawings, in which:

FIG. 10 illustrates a logical flow diagram of an embodiment of a method for identifying a chunk end time in a flow in a media session.

FIG. 11 illustrates a logical flow diagram of an embodiment of a method for determining QoE metrics for a media session.

DETAILED DESCRIPTION

The description and drawings merely illustrate the principles of various embodiments. It will thus be appreciated that those skilled in the art will be able to devise various arrangements that, although not explicitly described or shown herein, embody the principles herein and in the claims and fall within the spirit and scope of the disclosure. Furthermore, all examples recited herein are principally intended expressly to be only for pedagogical purposes to aid the reader in understanding the principles of the embodiments and the concepts contributed by the inventor to furthering the art, and are to be construed as being without limitation to such specifically recited examples and conditions. Moreover, all statements herein reciting principles, aspects, and embodiments, as well as specific examples thereof, are intended to encompass equivalents thereof.

Figure 1:
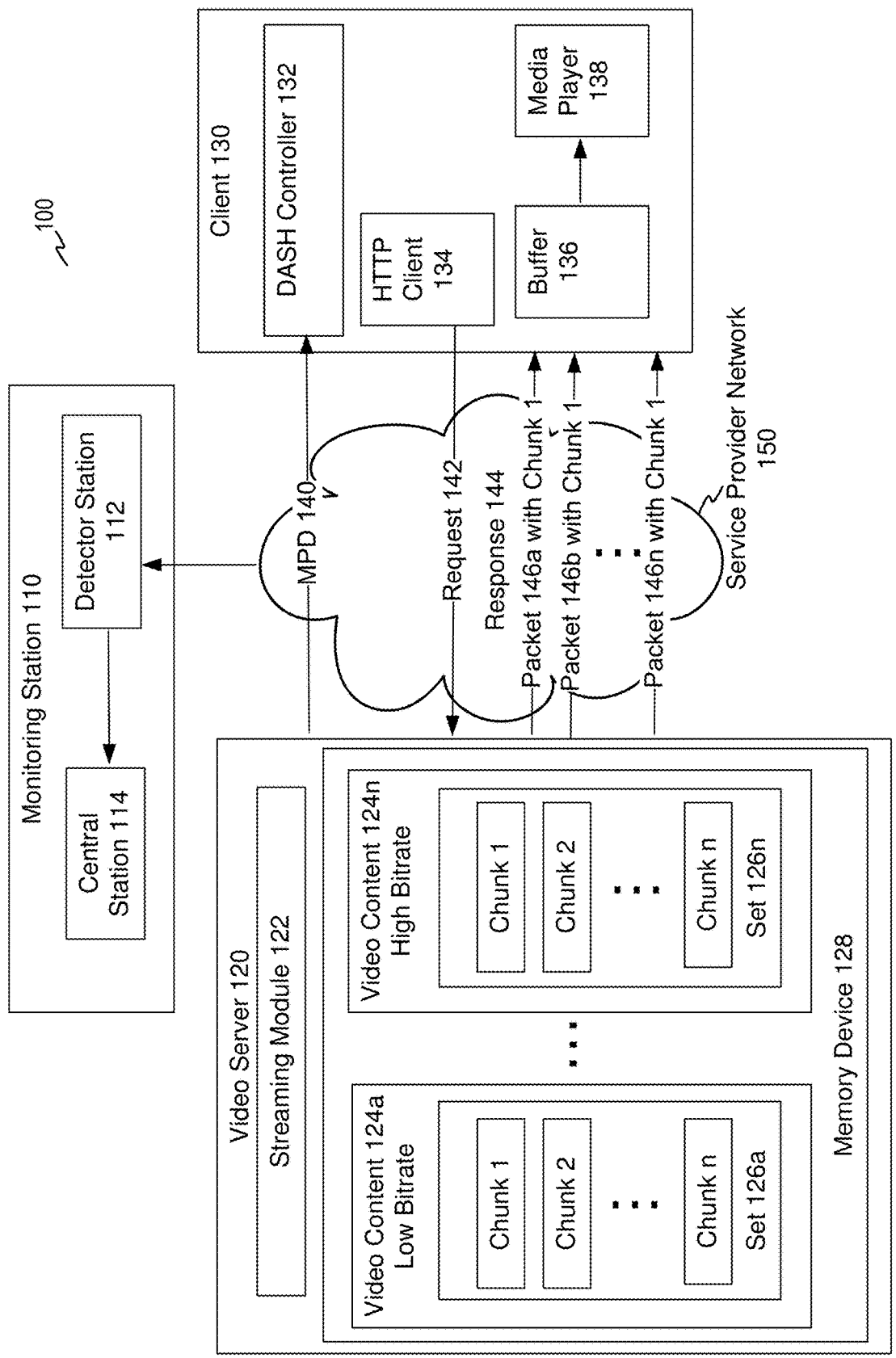
FIG. 1 illustrates a schematic block diagram of an embodiment of a network for quality of service monitoring.

One or more of the below abbreviations may be referred to herein:
IP: Internet Protocol
ML: Machine Learning
TCP: Transport Control Protocol
SSL: Secure Sockets Layer
TLS: Transport Layer Security
UDP: User Datagram Protocol
HTTP: HyperText Transfer Protocol
HTTPS: HTTP Secure
DASH: Dynamic Adaptive Streaming over HTTP
MPEG: Motion Picture Expert Group
ABR: Adaptive Bitrate
QoE: Quality of Experience
QoS: Quality of Service
QUIC: Quick UDP Internet Connections Network for QoS Monitoring FIG. 1 illustrates a schematic block diagram of an embodiment of a network 100 for quality of service (QoS) or quality of experience (QoE) monitoring. The terms QoS and QoE are used herein interchangeably to refer to any type of metric of media flows or client experience. The network 100 in this example includes a monitoring station 110, video server 120 and client device or client 130, each of which is described in more detail herein. The network 100 includes only one possible example of a media distribution architecture and other architectures over wireless or wired networks may also be implemented herein.

In an embodiment, the video server 120 includes a streaming controller or streaming module 122 configured to control HTTP-based streaming for provision of the video content 124. Though shown as a single device, the video server 120 may include a plurality of servers or storage devices or other devices configured for the provisioning of video content 124. The video content 124 may include audio content only, video content only or both audio and video content. The video content 124 is encoded into a plurality of sets of segments or chunks 126. Each set of the video content 124 includes a plurality of chunks with different encoded versions of the video content 124. For example, the video content 124a is encoded in a first set 126a of chunks with a low bitrate while the same video content 124n is encoded into a second set 126n of chunks with a second, high bitrate. The video content 124 may thus be decomposed into a plurality of sets 126a-n of chunks, each of the sets having different bitrates. A set 126 of the chunks may be stored or presented in discrete files or as byte ranges in a single media file. Each of the chunks thus includes a portion of the video content 124 encoded with one of a plurality of bit rates. The sets 126a-n of chunks are stored in a memory device 128 included or external to the video server. The memory device 128 includes one or more non-transitory memories or storage devices configured to store digital information.

The video server 120 stores an associated media presentation description (MPD) for the video content 124. The MPD describes a manifest of the video content, the alternative versions, their URL addresses, and other characteristics. The MPD identifies the various content components and the location of the alternative bit-rate streams. This enables the DASH controller 132 in the client 130 to identify and start playback of the video content 124, switch between alternate bit-rates as necessary to adapt to changing buffer status, and change adaptation sets to respond to user input, like enabling/disabling subtitles or changing languages.

The client 130 communicates with the video server 120 over one or more wireless or wired networks including service provider network 150. The DASH controller 132 of the client 130 receives the MPD 140 for the video content 124. The MPD can be delivered using HTTP, email, broadcast, or other transports. By parsing the MPD, the DASH controller 132 obtains information relating to the video content availability, media types, resolutions, minimum and maximum bandwidths, and the existence of various encoded alternatives of the video content 124. Using this information, the DASH controller 132 selects one of the sets of chunks with an appropriate bit rate.

The HTTP client 134 requests an initial chunk of the selected set of the video content 124 using a request message 142, such as an HTTP GET or partial GET methods. In response to the request message 142, the video server 120 transmits an HTTP response message 144 including one or more IP packets 146a-n, each with a portion of the requested chunk. The client 130 continues to transmit request messages for subsequent chunks and also monitors the network bandwidth fluctuations. Depending on its measurements, the client 130 determines how to adapt to the available bandwidth by fetching chunks of different alternative sets with lower or higher bitrates to maintain an adequate buffer occupancy. Though an HTTP GET message and HTTP response are described herein, any type of protocol may be implemented herein wherein the client 130 requests video content in chunks or segments and receives the video content chunk by chunk as requested. The number of sets 126a-n of video content and the the number of chunks 126a-n are independent and are also independent from the number of packets 146a-n.

The client 130 thus controls the delivery of the chunks, i.e., it manages the on-time requests and smooth playout of the sequence of chunks, potentially adjusting bitrates of the chunks, for example, to react to changes of in the network conditions or the user preferences. The client 130 includes a playout buffer or chunk buffer 136 to temporarily store chunks to be used during playback. The client buffer 136 helps to absorb network variation, specifically network delay and jitter variation, and helps to provide a smooth playback experience for the user. In order to have an adequate buffer level or buffer occupancy, the client 130 requests the video content chunk by chunk using the HTTP requests 142 and dynamically determines the resolution of the next chunk to request based on current network condition and client playout buffer status.

The video content is often delivered over a mobile network, the Internet or other wide area network provisioned by one or more service providers. The service provider network 150 may include one or more of a core network, metro network, enterprise network or access network provided by one or more service providers.

In order to monitor the QoE, a monitoring station 110 is implemented in the service provider network 150 to monitor traffic between the video server 120 and client 130. The monitoring station 110 identifies the packets, flows and media sessions between video servers 120 and clients 130 and provides QoE metrics for the packets, flows and media session.

The monitoring station 110 may include two types of components: one or more detector stations 112 and a central station 114. The detector station 112 is deployed in the service provider network 150 and monitors the packets transmitted over various interfaces between network elements in the service provider network 150. The detector station 112 may perform auto-discovery protocols to determine a network topology. The detector station 112 may thus map the path of each packet through the network. A central station 114 communicates with the deployed detector stations 112. The central station 114 receives packet flow records and events from the one or more detector stations 112.

Figure 2:
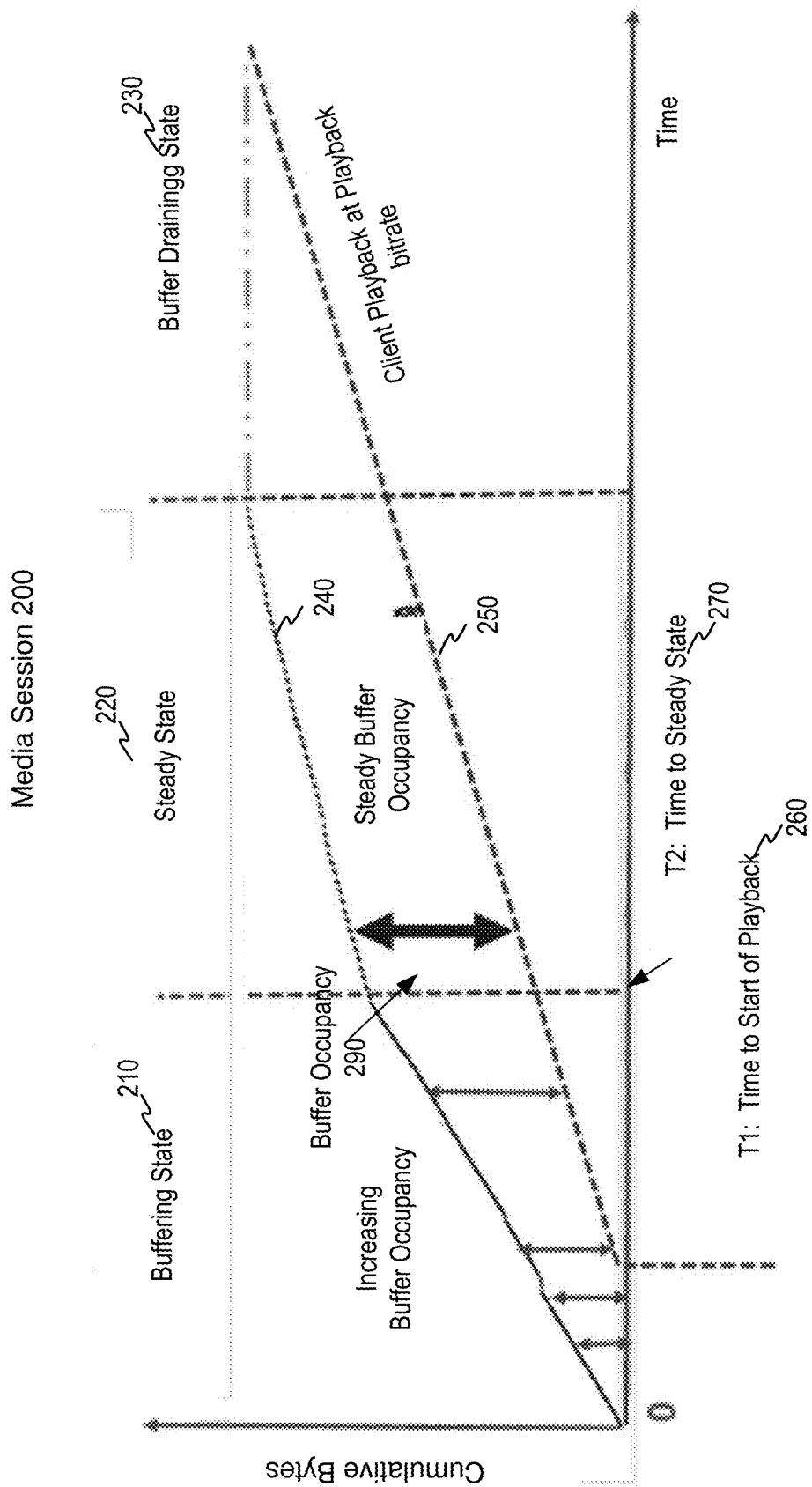
FIG. 2 illustrates a graphical diagram of the various stages of a media session in a client.

FIG. 2 illustrates a graphical diagram of the various stages of a media session 200 in a client 130. The graph illustrates the cumulative bytes received by the client 240, and the cumulative bytes consumed by the client playback process 250 over time. The difference between any two points corresponding to the same time instance on the lines 240 and 250 represent buffer occupancy 290. In general, at the beginning of the media session 200, the buffer occupancy 290 is below a certain low threshold value. The client 130 requests chunks at a high rate to increase the buffer occupancy 290. For example, the client 130 continually transmits request messages for chunks to the video server 120. This region of the media session is called the buffering state 210. During the buffering state 210, the download bit rate is greater than the playback bit rate, as represented by the greater slope of the cumulative bytes received by the client 240 to the slope of the cumulative bytes consumed by the client playback process 250. The time to start of playback 260 is marked at T1, and indicates the time that a client begins the client playback process.

Once the buffer occupancy reaches a certain threshold value, the client 130 slows its request rate of chunks to a rate commiserate with the playback rate. This region of the media session 200 is called the steady state 220. The time to steady state 270 is marked at T2. During the steady state 220, the client 130 retrieves chunks from the server 120 at an approximately same or similar rate as the playback bitrate. The buffer occupancy 290 remains constant, as represented by the similar slope of the cumulative bytes received by the client 240 to the slope of the consumed video content in the client playback process 250.

During buffer draining state, the client 130 does not retrieve any further chunks from the video server 120. The buffer is drained as playback continues. This decreasing buffer occupancy 290 is represented by the flat slope of the cumulative bytes received by client 240 compared to the increasing slope of the cumulative bytes consumed by the client playback process 250.

The client's methods for determining the buffer threshold values and the requested bitrate for chunks in the media session may vary. Different clients 130 use different Adaptive Bit Rate (ABR) algorithms, any of which may be implemented herein.

In order to monitor media sessions, service providers until recently used Deep Packet Inspection (DPI) to determine a Quality of Experience (QoE) or Quality of Service (QoS) of a video service delivered to a client 130. In some versions of the HTTP protocol, the content of the HTTP GET request and HTTP response messages are observable. The meta-data in these messages include details of client requests, and as a result, client playout buffer occupancy is more easily determined. However, DPI becomes ineffective as major content providers, such as YouTube® and Netflix®, are encrypting network traffic, e.g., by delivering DASH over HTTPS over TCP, or by delivering DASH over HTTP over QUIC over UDP.

Furthermore, service provider networks 150 may employ different transport layer protocols in the implementation of DASH-HTTPS and implement different types of wireless networks (e.g., WLAN, 3G or 4G cellular service, etc.) and/or wired networks. Some service provider networks 150 implement Transmission Control Protocol (TCP), while other networks may implement User Datagram Protocol (UDP). Some networks support concurrent TCP or UDP flows to deliver multiple chunks simultaneously. Some networks support one flow per chunk, while others use one flow for multiple chunks. In some instances, the video server 120 provides chunks that are a mixture of audio and video content. In other instances, video and audio tracks for the same multimedia content are stored in separate files and divided into chunks separately, and requested by the client 130 using shared or individual TCP or UDP flows. In addition, the client 130 for a given service may use different ABR algorithms resulting in different behavior given the same service. In addition, even the browser or App form, or even different versions of an operating system (OS) on the same client platform, such as iOS® or Android® may affect the behavior. These different behaviors and capabilities further complicate QoE monitoring.

Thus, there is a need for an improved QoE monitoring system and method that is able to monitor encrypted media sessions and provide QoE metrics in a media session. In addition, the QoE monitoring system and method needs to be able to function with any of the various types of transport protocols (e.g., UDP or TCP), client platforms, operating systems or other type of varying factors.

In an embodiment herein, QoE metrics of a media session is estimated from observable video traffic in the network 100. In particular, chunks in a flow of a media session 200 are identified and chunk information is derived from layer 3 (IP) level traffic using packet size and timing information. The monitoring station 110 herein may thus provide QoE information for any type of video delivery wherein a client 130 requests the video content in segments, e.g. chunk by chunk, from a video server 120. The monitoring station 110 identifies the fundamental behavior of a chunk request pattern, e.g. the request 142 from the client 130 followed by a response 144 including one or more packets from the video server 120. The QoE method of the monitoring station 110 may monitor request and response messages of various types of protocols (HTTP or HTTPS) regardless of the timing of the chunk delivery, or the transport layer protocol (TCP or UDP) or the use of any cryptographic protocols that provide transport layer security, for example TLS or SSL.

Overview of In-Network Traffic Monitoring

The monitoring station 110 intercepts IP packets or copies of the IP packets in the network 100. The monitoring station 110 recognizes and records the time instance the packet arrives at the in-network monitoring station (e.g. the detector station 112). The monitoring station 110 stores and uses this arrival time to determine various measurements described herein. This approach (e.g., rather than use of a timestamp in a packet) removes any problems due to clock synchronization as any client, server or routers may use different clocks, and the clocks may not be synchronized.

The monitoring station 110 further records basic IP packet data, including source IP address, source IP port, destination IP address, destination IP port, and protocol. Based on this basic IP packet data, the monitor station detects whether the IP packet is from or to a video server or video content provider. For example, the monitoring station 110 includes address information for a first set of web servers for one or more video services, wherein the web servers provide web objects, such as HTML, scripts and images. The monitoring station 110 also includes address information for a second set of video servers for the video services. The video servers provide the video content for the video service. For example, YouTube® audio and video asserts are currently delivered mostly in the form of "googlevideo.com".

From a given client device and video service, the monitoring station 110 identifies requests to and responses from the set of web servers of the video service to determine the start and/or end of a media session (audio, video or audio and video). In addition, from the given client device and video service, the monitoring station 110 identifies requests to a video server and response from a video server for the video service to identify flows and chunks.

The monitoring station 110 is thus able to identify flows between a client 130 and a video server 120. In one embodiment, the term flow defines a bi-directional transport level connection. The flow includes IP packets having the same basic IP packet data (e.g., source IP address, source IP port, destination IP address, destination IP port, protocol), or with source and destination (IP address and IP port) pair reversed. The flow may include, e.g., a TCP flow or UDP flow or other protocol.

Figure 3:
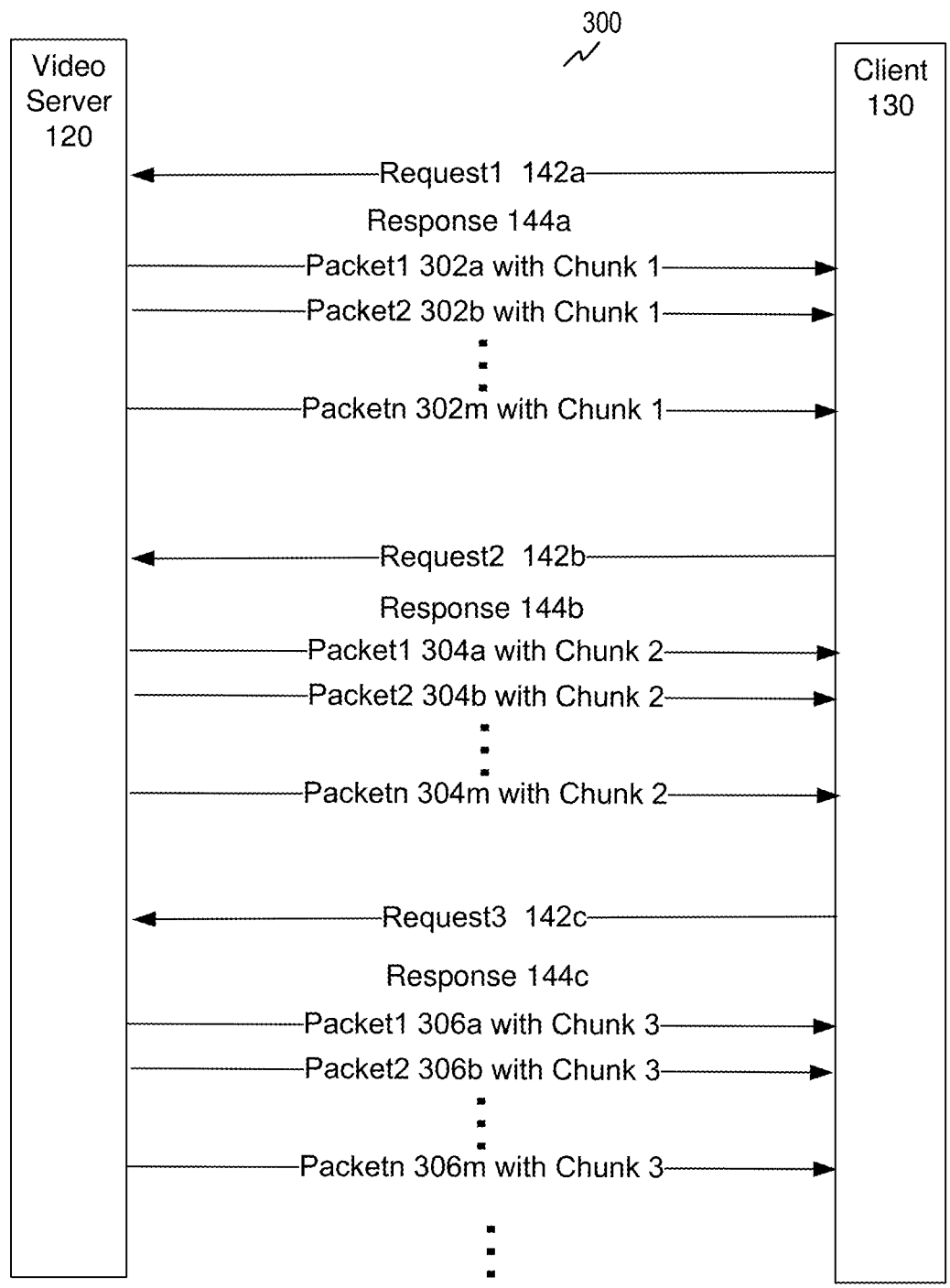
FIG. 3 illustrates a schematic block diagram of a flow in a DASH type media session.

FIG. 3 illustrates a schematic block diagram of a flow 300 in a media session 200. The flow 300 includes IP packets between the video server 120 and the client 130. An IP packet in a flow 300 is defined as either upstream or downstream. For example, herein, an upstream packet in a flow 300 is transmitted in a direction from the client 130 to the video server 120. A downstream packet in a flow 300 is transmitted in a direction from the video server 120 to the client 130. Thus, the request messages 142 are in the upstream direction while the response messages 144 are in the downstream direction, as the terms are defined herein.

Using the basic IP packet data, the monitoring station 110 identifies a flow 300 in a media session 200. For example, using the IP addresses of video servers in a video service (such as YouTube® and Netflix®), the monitoring station 110 determines when packets are exchanged between a video server 120 and a client 130. The monitoring station 110 identifies this exchange of packets as a flow 300 in a media session 200.

The flow includes one or more request messages 142a-n and one or more response messages 144a-n. The request 142 and response messages 144 are exchanged between the client 130 and the video server 120 using, for example, a TCP or UDP protocol. In this example, the client 130 transmits a first request message 142a (such as an HTTP GET message) including a request for a first chunk 1 of video content 124. In response, the video server 120 transmits a response message 144a (such as an HTTP response) including a plurality of IP packets 302a-n, each including a portion of the requested chunk 1. The client 130 further transmits a second request 142b for a second chunk 2 of the video content 124. The video server 120 transmits a response 144b including one or more packets 304a-n. The client 130 further transmits a third request 142c for a third chunk 3 of the video content 124. The video server 120 transmits a third response 144c including one or more packets 306a-n. The client 130 may continue to request chunks until the video content 124 is complete, or it receives further user input. The flow 300 thus includes a request message that includes a request for a segment or chunk of video content and a response message including one or more packets, wherein each packet includes a portion of the requested chunk. A media session 200 may include one or more flows 300.

In an embodiment described herein, the monitoring station 110 identifies a request message 142 in the flow 300 using a packet size. In general, the request message exhibits a pattern in IP packet size for a video service. For example, in the YouTube® video service, an average HTTP GET message has an IP packet size typically in the range from 500 B-1.4 KB. Though IP packet fragmentation may occur in the network, the monitoring station 110 includes a fragmented IP packet reconstructing module to reconstruct the fragmented IP packets belonging to the same HTTP GET message. The monitoring station 110 compares the IP packet size of packets transmitted upstream from the client 130 to the video server 120 in the flow 300 to identify the request message. When a message is within a range or pattern size, the monitoring station 110 then identifies the IP packet as a request message in the flow.

After identifying the request message, the monitoring station 110 is configured to identify a response message that includes at least one IP packet. In one embodiment, the monitoring station 110 assumes that any subsequent downstream IP packet transmitted from the video server 120 to the client 130 after a request message includes the response message. Alternatively, the monitoring station 110 may also compare subsequent downstream IP packets to a size threshold. In general, the size of the response message is significantly larger than the request message size. The monitoring station 110 may monitor for a subsequent downstream IP packet having a size greater than a predetermined size threshold. Using one or more of these methods, the monitoring station 110 identifies the IP packet at the beginning of the response.

When identifying request and response messages in a flow, packets in the TLS handshake process are ignored. For example, the monitoring station 110 assumes that a request message is not part of the TLS handshake process and TLS packets with type other than "Application Data" belong to TLS handshake process. With the examination of TCP header, the monitoring station 110 can discard TCP packets without payload or TCP retransmission packets, as these packets do not contribute to the size calculation of request or response messages for chunks.

In an embodiment, the monitoring station 110 identifies the "chunk start time" as the time instance observed by the monitoring station 110 when the first packet of the request message from the client 130 to the server 120 passes the monitoring station 110. The monitoring station 110 further identifies the "chunk end time" as the time instance observed by the monitoring station 110 when the last packet of the response message from the server to the client passes the monitor station 110. For example, the chunk1 start time is the arrival time of the first packet of the Request1 142a message at the monitoring station 110. The chunk1 end time is the arrival time of the last IP packet 302m in the Response 144a at the monitoring station 110. In another example, the chunk2 start time is the arrival time of the Request2 142b packet at the monitoring station 110. The chunk2 end time is the arrival time of the last Response2 packet 304m at the monitoring station 110. Though various elements are marked with a number "n" or a number "m", the actual number n or the number m of the elements are independent. For example, the number "n" or number "m" of the following elements are independent from each other: request messages 142a-n, response message 144a-n, packets 302a-m with chunk 1, packets 304a-m with chunk 2, and packets 306a-m with chunk 3.

Other chunk start and end times may be defined. For example, when a timestamp option appears in either an IP header or TCP header, these timestamp values may be used to determine the chunk start time and chunk end time. However, this approach requires the assumption that the clocks are synchronized at the client and server that set the timestamp values.

Real-Time Packet-Based Chunk Detection Mechanism

The monitoring station 110 is configured to examine IP packets and identify a flow 300 in a media session 200, and the start and the end of the download of "a chunk" of the video content in real time as IP packets pass through. There are two ways that the video server 120 may transmit chunks to the client within a flow 300, sequential or concurrent. The chunk detection mechanism may include a first mechanism for sequential transmission of chunks and a second mechanism for concurrent transmission of chunks. A unified approach for chunk detection without any assumption on sequential or concurrent transmission within a flow is also described.

Chunk Detection for Sequential Transmission of Chunks within a Flow

Figure 4:
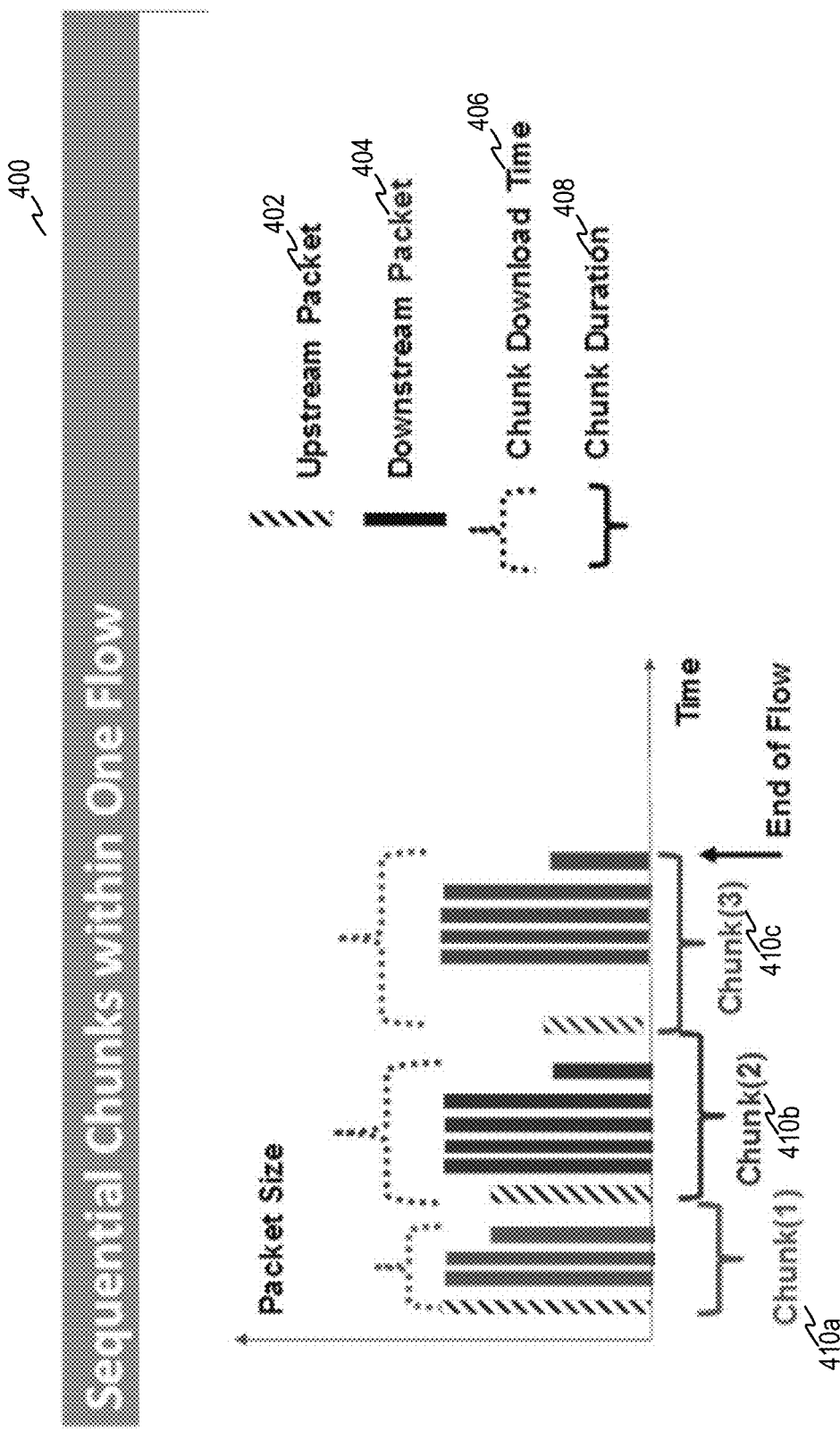
FIG. 4 illustrates a graphical representation of a sequential transmission of chunks in a flow.

FIG. 4 illustrates a graphical representation 400 of a sequential transmission of chunks in a flow 300. In this example, the upstream packet 402 includes a request message. The request message is followed by a response message having one or more downstream packets 404, each packet including a portion of the requested chunk of video content. In this mechanism, the chunks 410a-c are delivered sequentially over the transport level flow (e.g., a TCP flow or UDP flow). For example, a transmission of a first chunk i is completed prior to the beginning of the transmission of the next chunk i+1. Assuming a sequential transmission of chunks for a flow, in an embodiment, the monitoring station 110 detects chunks using the following procedure.

Detecting a Start of a Chunk

The monitoring station 110 detects a request message in a flow 300 of a media session 200 between a client 130 and video server 120 using a size pattern or predetermined size range of a typical request message for a video service. For example, the monitoring station 110 is configured to identify one or more consecutive IP packets in a flow from the client 130 to the video server 120, wherein the one or more consecutive IP packets have a specified size pattern or predetermined size range. The predetermined size range or size pattern is determined based on a maximum and a minimum of request messages for a given video service. The predetermined size range may vary depending on the video service. In case of IP fragmentation, the monitoring station 110 determines a cumulative size of a set of consecutive upstream packets in the flow 300. Let "X" denote the sum of the sizes of consecutive IP packets in the upstream direction in the flow.

The predetermined size range or size pattern may include only a lower bound or threshold. For example, for the YouTube® video service, the size range is approximately L=500 B, wherein L is the lower threshold in the size range. Note that without an upper bound on the client request message size, any number of consecutive upstream packets may be grouped into one client request message. As a result, multiple consecutive client request messages may be identified as one request message.

In another embodiment, the predetermined size range or size pattern includes an upper threshold U and a lower threshold L, e.g., "U>X>=L". For example, for the YouTube® video service, the predetermined size range is approximately U=1.4 KB and L=500 B. The number of request messages detected is directly influenced by the threshold values U and L. The accuracy increases as the values of U and L are more accurate. In general, the maximum number of request messages is N_max=round(X/L) and the minimum number of request messages is N_min=round(X/U) for the group of consecutive upstream packets with total size of X. The total number of client request messages represented by the group can be determined accurately by N_max=N_min if and only if U/L<=2. Otherwise, any integer value in the range [N_max, N_min] can serve as the number of client request messages.

The thresholds L and U may be varied for different video service providers, such as YouTube®, Netflix® and Hulu®. The monitoring station 110 may monitor and examine traffic for various video services to generate and update the thresholds L and U for a minimum or maximum size of a request message.

Once a request message is identified, the start of the "chunk" is defined herein as the arrival time of the first packet of the request message at the monitoring station 110.

Detecting an End of a Chunk

The end of a current chunk "i" is detected when another request message is detected in the flow. For example, the monitoring station 110 identifies another request message and marks the start of a next chunk "i+1". The monitoring station 110 then marks the last packet in the downstream direction immediately before the start of chunk "i+1" as the end of chunk "i". In addition, when the flow ends due to any reason, the monitoring station 110 marks the last packet in the flow 300 in the downstream direction as the end of the current chunk "i".

Chunk Statistics

Once the start and end times of "chunks" are identified in a flow 300, the monitoring station 110 may determine one or more chunk statistics, such as the following chunk statistics. These chunk statistics are exemplary and other statistics may be determined or other definitions for these statistics may be implemented.

Chunk_Start_Time (i): The start time for chunk "i" is the time when the monitoring station 110 detects the first packet of the request message for chunk "i" sent in the upstream direction. Alternatively, the start time for chunk "i" is the timestamp in the first packet of the request message for chunk "i" sent in the upstream direction. In another embodiment, the chunk start time may begin at the first packet of the downstream message including chunk "i".

Chunk_End_Time (i): The end time for chunk "i" is the time when the monitoring station 110 detects the last packet of the response message for chunk "i" sent in the downstream direction. Alternatively, the end time for chunk "i" is the timestamp in the last packet of the response message for chunk "i" sent in the downstream direction.

Chunk_Size(i): The size of chunk "i" is the cumulative bytes sent in the downstream direction on the given transport level flow between the start of chunk "i" and the start of chunk "i+1" without counting any transport layer signalling packets such as standalone TCP_ACK packets, or transport layer retransmission packets such as TCP retransmission packets. For example, the amount of data or bytes in data packets are included in the chunk size while bytes in signalling packets are ignored. The chunk size is thus an amount of data transmitted in the downstream between the start of the chunk i and the end of the chunk i.

Chunk_Download_Time (i)=Chunk_End_Time (i)–Chunk_Start_Time (i): The chunk download time 406 for a chunk i is the difference in time from the chunk start time to the chunk end time. As seen in FIG. 4, the chunk start time in this embodiment is defined as the first packet of the request message for chunk "i" sent in the upstream direction. The chunk end time is defined as the last packet of the response message for chunk "i" sent in the downstream direction.

Chunk Duration (i)=Chunk_Start_Time (i+1)–Chunk_Start_Time (i): The chunk duration 408 for a chunk i is the difference in time from the chunk start time of chunk i to the chunk start time of chunk i+1.

Chunk_Gap (i)=Chunk_Duration (i)–Chunk_Download_Time (i): The chunk gap is the time between an end of a chunk i and a request for another chunk i+1. It may be calculated as the difference between the chunk duration of chunk i and chunk download time of chunk i.

Chunk_Throughput (i)=Chunk_Size (i)/Chunk_Duration (i): The chunk throughput is defined as the chunk size of a chunk i divided by the chunk duration of the chunk i.

Saturated_Chunk_Throughput (i)=Chunk_Size(i)/Chunk_Download_Time (i): The saturated chunk throughput is defined as the chunk size of a chunk i divided by the chunk download time of a chunk i.

Chunk_Throuput_Gap (i)=Saturated_Chunk_Throughput (i)–Chunk_Throughput(i): The chunk throughput gap is also called the network headroom for the chunk. It is defined as the difference between the saturated chunk throughput and the chunk throughput for a chunk i. It indicates the extra capacity the network has to delivery chunk i.

Though the above statistics are defined for a single chunk, the same definitions may be applied over a plurality of chunks i, i+1, i+2, . . . i+n to determine the average or mean values of the statistics for the plurality of chunks. In another embodiment, the statistics may be determined for a number of chunks over a sliding window of time or for a fixed period of time over a flow or media session.

In summary, the monitoring station 110 monitors packets over one or more interfaces in the network. The monitoring station 110 identifies a flow in a media session. The monitoring station 110 determines a start of a chunk in the flow using packet size of a request message and determines an end of the chunk in the flow using a start of a next or subsequent request message. Using the start and end times of the chunks in a flow, the monitoring station 110 determines one or more chunk statistics, such as chunk size, chunk duration, chunk download time, chunk throughput, saturated chunk throughput, and chunk throughput gap.

Chunk Detection for Concurrent Transmission of Chunks within a Flow

Figure 5:
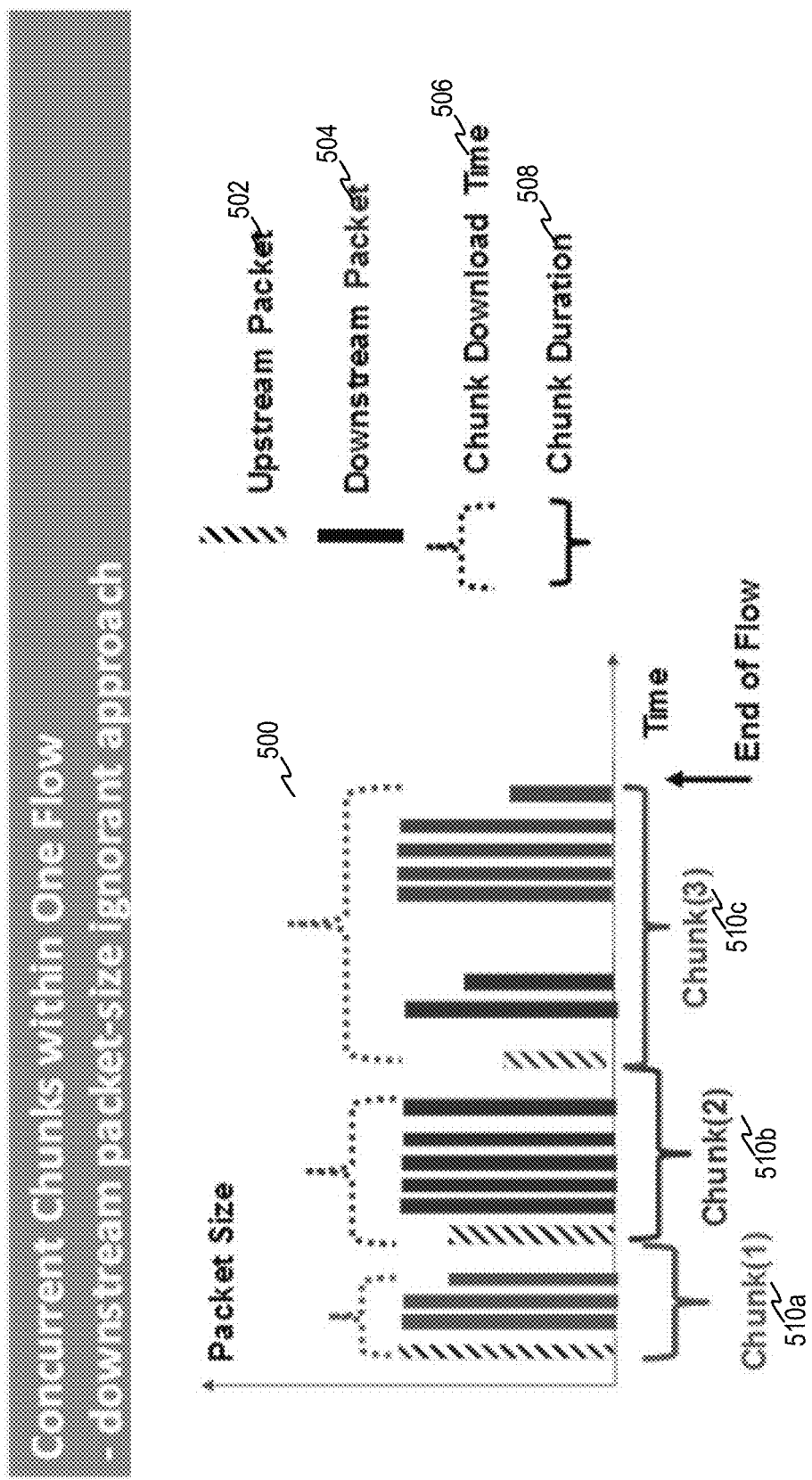
FIG. 5 illustrates a graphical representation of a concurrent transmission of chunks in a flow.

FIG. 5 illustrates a graphical representation 500 of a concurrent transmission of chunks in a flow 300. In this case, the chunks may be delivered concurrently or in an overlapping fashion in a transport level flow (e.g., a TCP flow or UDP flow). In this example, the upstream packet 502 includes a request message. The request message is followed by a response message including one or more downstream packets 504, each including a portion of a chunk of a media content. In concurrent transmission, a second request message for a next chunk i+1 and response message including a next chunk i+1 may be transmitted while a first chunk i is delivered over the transport level flow.

For example, this case may occur when HTTP/2 or Quick UDP Internet Connections (QUIC) protocols are implemented. Concurrent requests for multiple chunks (for example video and audio chunks for the same video content) may be sent over concurrent QUIC streams in a QUIC session. Similarly, video and audio chunks may be sent over concurrent streams in one HTTP/2 session.

Packet-Size Ignorant Approach in Concurrent Transmission

In one method, the monitoring station 110 assumes that all chunks are delivered sequentially in a flow even when concurrent chunks can appear in the flow. This approach is termed the "packet-size ignorant approach" in concurrent transmission. The monitoring station 110 uses the same methods and definitions as sequential transmission and assumes that the chunks are sent sequentially in the downstream direction. However, this approach may result in a number of inaccuracies as shown in the example below.

In FIG. 5, the end of chunk (2) 510b overlaps with the start of chunk (3) 510c. Using the assumption that the chunks 510a-c are delivered sequentially in a flow, the monitoring station 110 identifies that chunk 2 ends with the last packet before the request message for chunk 3. In addition, the monitoring station 110 identifies that chunk 3 begins with the first packet of the request message for chunk (3). Using this method for detection, the monitoring station 110 inaccurately includes some of the packets of chunk 2 as part of chunk 3.

Due to these errors, a few inaccuracies in the chunk statistics result. For example, the measured end time for chunk (2) is shorter than reality and thus the chunk duration 508 is shorter than reality. The measured chunk size and chunk download time 506 of chunk (2) are smaller than reality. The calculated chunk throughput and saturated throughput for chunk (2) are both different than reality. The measured chunk gap for chunk (2) is positive, while chunk (2) overlaps with chunk (3) in reality, therefore, its chunk gap is negative by definition. The measured chunk size of chunk (3) is larger than reality as part of chunk (2) is counted as part of chunk (3). The chunk download time 506 and the chunk duration 508 of chunk 3 are longer than reality. The calculated chunk throughput and saturated chunk throughput for chunk (3) are both higher than reality.

However, these inaccuracies for the individual chunks (2) and (3) may be statistically inconsequential for the QoE measurements over an average of a plurality of chunks in a sliding window of time or in a fixed time period in a flow 300 or over a plurality of flows 300 in an entire media session 200.

Downstream Packet-Size Aware Approach in Concurrent Transmission

Figure 6:
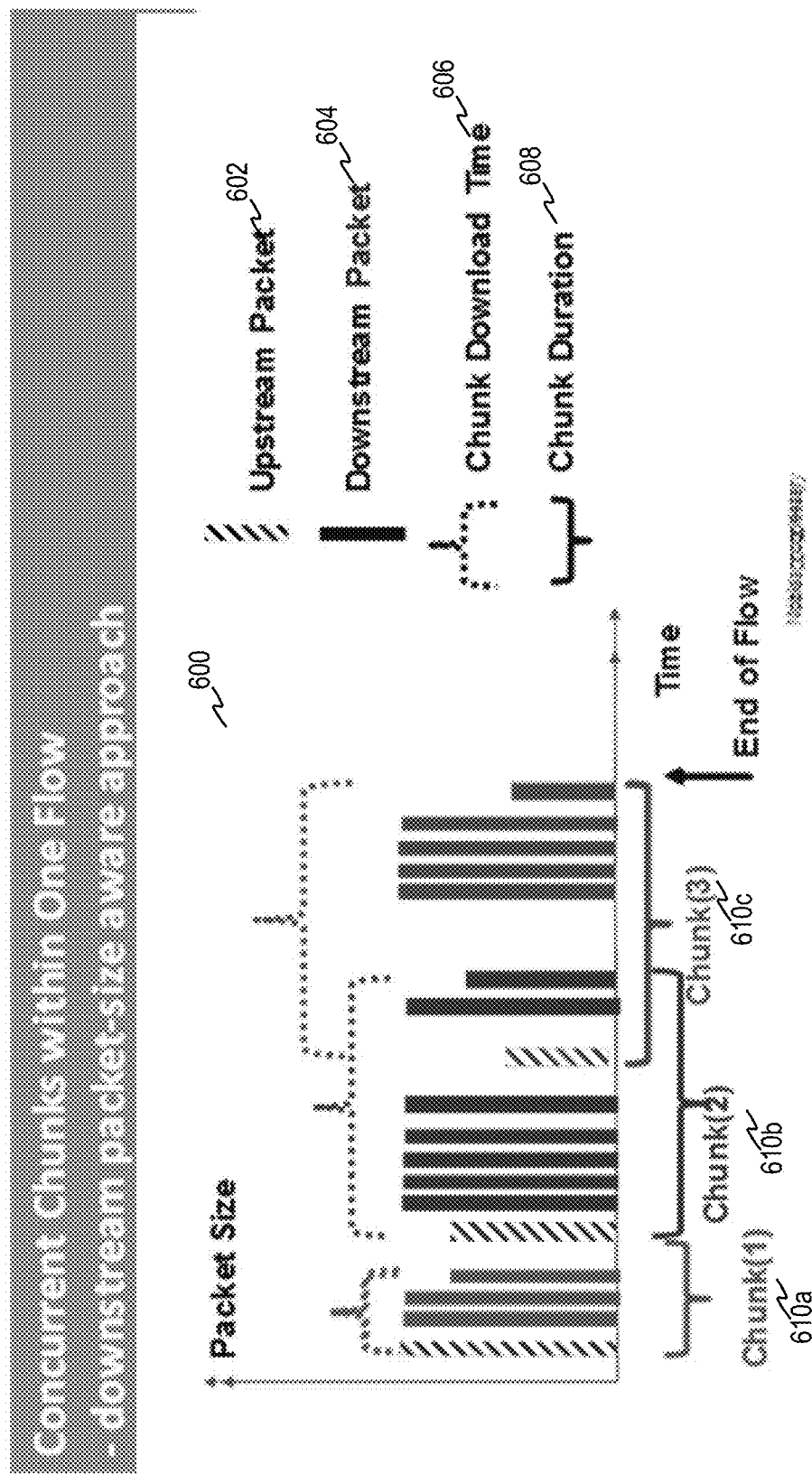
FIG. 6 illustrates a graphical representation of a concurrent transmission of chunks in a flow.

FIG. 6 illustrates a graphical representation 600 of a concurrent transmission of chunks in a flow. In this example, the upstream packets 602 include request messages. The downstream packets 604 include a response message including one or more packets with a portion of chunk i of media content. In this embodiment, the monitoring station 110 identifies the end of a chunk i using one or more observable features of the downstream packets 604. For example, a response message is typically sent over multiple IP packets, wherein each packet has a large size, e.g., a Network Layer Maximum Transmission Unit (MTU) size. However, the last IP packet in the response message may exhibit a smaller size, e.g. a size smaller than the MTU size.

In use, after detection of a request message for chunk i, the monitoring station 110 observes the size of the downstream packets and detects an IP packet with a size smaller than a predetermined threshold (such as an MTU size, average size of previous packets or other threshold). The monitoring station 110 then identifies this smaller size IP packet as the last packet of chunk i. The example in FIG. 6 illustrates a special case of overlapping delivery of chunk (2) and chunk (3) wherein the downstream packets of each chunk (constituting the response message for each chunk) are delivered sequentially without any overlap. However, the request message of chunk (3) appears before the end of the response message of chunk (2).

When the start of a chunk "i+1" is detected, the monitoring station 110 observes the packet size of the downstream packets 604. When a packet in the downstream direction has a smaller size than the immediately preceding packet or has a smaller size than a predetermined threshold (such as MTU size or average response size), the monitoring station 110 identifies this packet as the end of chunk "i".

When the start of a chunk "i+1" is detected, the monitoring station 110 may determine whether the preceding downstream packet exhibits an IP packet size greater than a predetermined threshold, (e.g. the packet is roughly a network layer MTU size or other threshold). If so, the monitoring station 110 may delay marking the end of chunk "i". The monitoring station 110 then observes the size of the downstream packets and detects an IP packet with a size smaller than a predetermined threshold (such as an MTU size, average size of previous packets or other threshold). Then the monitoring station 110 identifies this packet as the end of chunk "i".

Additionally, the monitoring station 110 identifies when the transport level flow ends due to any reason. The monitoring station 110 then marks the last packet in the flow in the downstream direction as the end of the current chunk.

In general, this downstream packet-size aware approach is able to more accurately detect the beginning and end of a chunk i when the request message of a chunk i+1 occurs before the end of chunk i, and there is no overlapping of response messages of different chunks. In addition, for the set of packets constituting a response message, the last network layer packet needs to exhibit a size smaller than a threshold value (e.g., network MTU size) while all other packets exhibit a larger size (e.g., at approximately MTU size).

Figure 7:
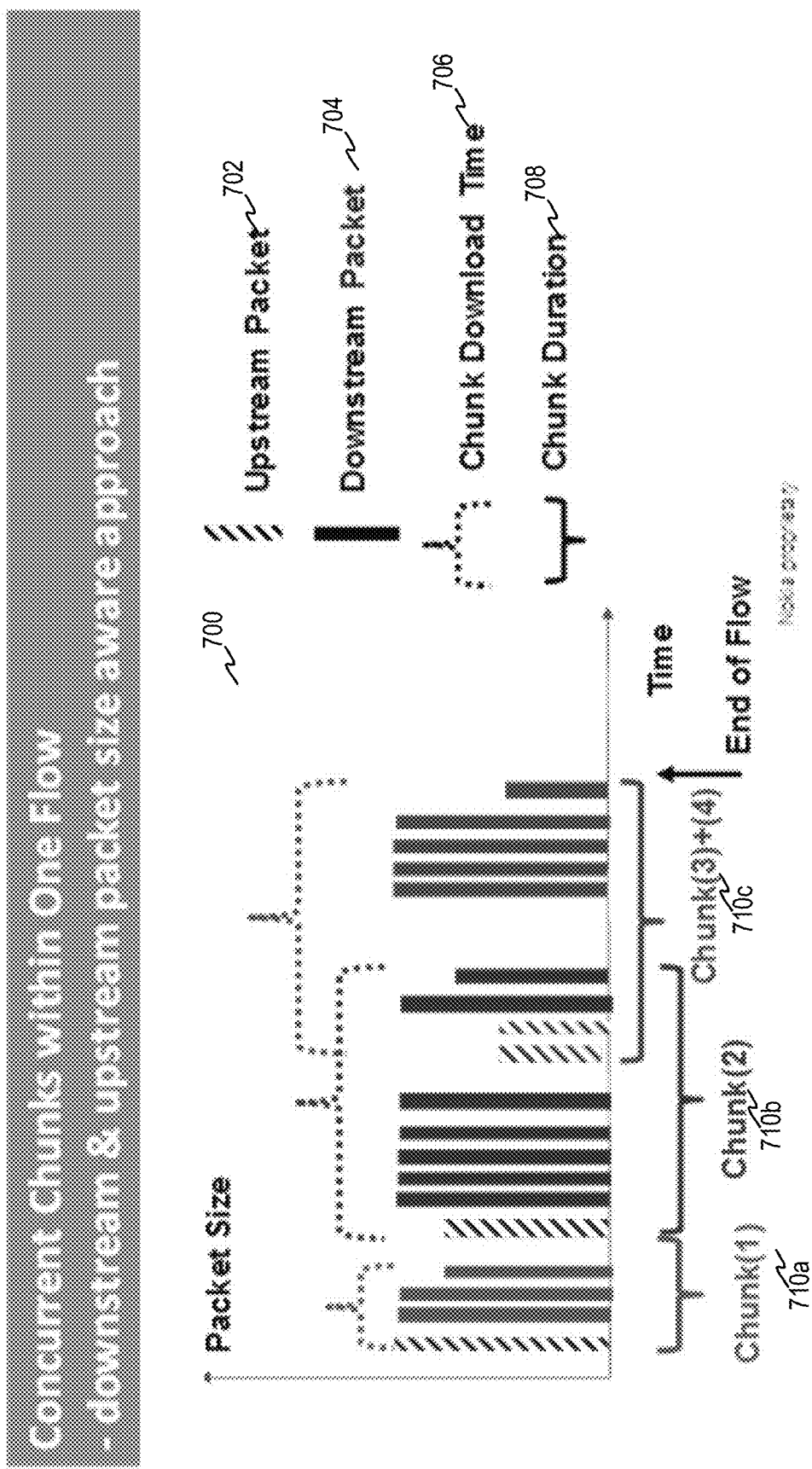
FIG. 7 illustrates a graphical representation of another example of concurrent transmission of chunks in a flow.

FIG. 7 illustrates a graphical representation 700 of another example of concurrent transmission of chunks 710a-c in a flow. In this example, the upstream packets 702 include request messages. The downstream packets 704 include packets of a response message, each including a portion of a chunk i of media content. In this example, the downstream packet-size aware approach may be unable to determine the request message for chunk 3 accurately. For example, the monitoring station 110 may determine that the last two upstream packets correspond to two separate request messages for a chunk (3) and a chunk (4) respectively. The chunk duration 708 and chunk download time 706 may thus be inaccurately determined for one or more of the chunks 710.

Thus, even when the downstream packet size aware mechanism can accurately detect the end of a chunk in concurrent transmission, complications may arise when the start of a chunk may not be determined based on packet size. For example, the upper bound U and lower bound L are configured as a predetermined size range of request messages. The monitoring station 110 then detects a group of consecutive upstream packets with total size of X. The total number of client request messages represented by the group of consecutive upstream packets is then determined by N_max=N_min if and only if U/L<=2. When U/L is greater than 2, any integer value in the range [N_max, N_min] can serve as the number of client request messages. In operational networks, this scenario rarely happens. Thus, it may not be statistically significant. The average throughput may not be affected over a sliding window over a flow 300 or media session 200 even when the chunk size is wrongly detected for one or more chunks. In experiments, these scenarios rarely happen so statistically these behaviours may not affect the determination of average throughputs or other measurements over a plurality of chunks.

Other cases may also occur in theory wherein the monitoring station 110 using the "downstream packet-size aware approach" may not accurately detect a "chunk duration" in concurrent transmissions. For example, the monitoring station 110 may inaccurately determine a chunk duration for a chunk i and chunk i+1 when downstream packets for the chunks i and i+1 with an MTU packet size are intermingled. For example, downstream packets including chunk (i+1) with an MTU packet size are transmitted prior to the last packet of chunk (i) having a smaller size. In another example, downstream packets including chunk (i) with an MTU packet size are transmitted after the request message for chunk (i+1) and no smaller packet size is observed to mark the end of chunk (i). These and other examples are theoretically possible that may provide inaccurate indications of chunk duration and chunk download time for one or more individual chunks.

Unified Approach for Chunk Detection within a Flow (Sequential or Concurrent)

The "downstream packet-size aware approach" may still include inaccurate detection of individual chunks in concurrent transmissions within a flow 300. As such, the monitoring station 110 may determine to assume that chunks are delivered sequentially within a flow. The monitoring station 110 may thus not change its method of detection of chunks in response to a sequential or concurrent transmission of chunks within a flow 300. The monitoring station 110 may thus determine chunk statistics using the approach described in the section Chunk Detection for Sequential Transmission of Chunks within a Flow.

This approach is practical based on the following observations. It may be difficult to determine whether the chunks are transmitted concurrently or sequentially based on the IP packet size information alone. Even when HTTP/2 and QUIC are implemented for concurrent streams to carry individual chunks concurrently, in deployed operational networks, it has been observed that chunks rarely overlap in time. Thus statistically, any inaccuracies in individual chunk detection are negligible in averages over a plurality of chunks for a media session or flow.

Figure 8:
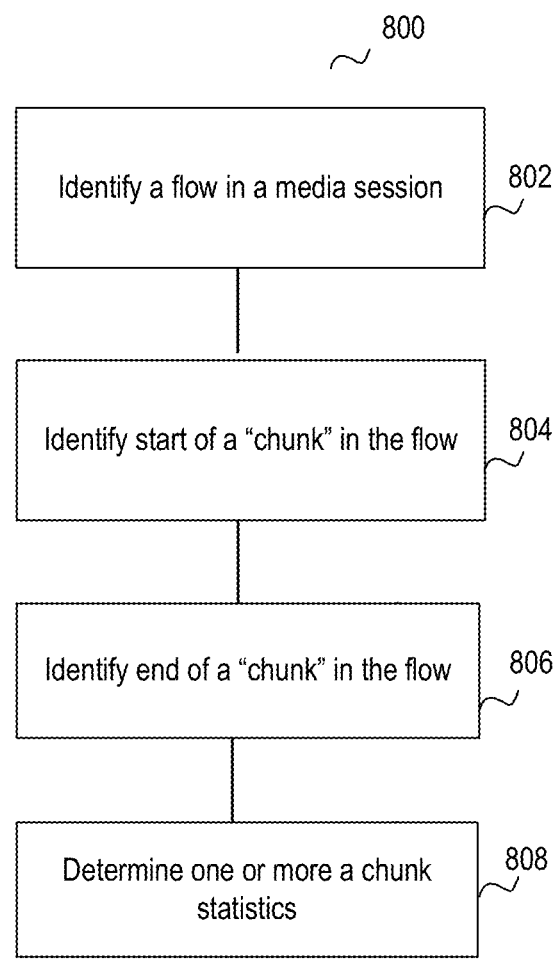
FIG. 8 illustrates a logical flow diagram of an embodiment of a method for QoS monitoring of a flow in a media session.

FIG. 8 illustrates a logical flow diagram of an embodiment of a method 800 for QoS monitoring of a flow 300 in a media session 200. The monitoring station 110 observes packets in a service provider network 150 and identifies a flow 300 in a media session 200 at 802. The monitoring station 110 compares basic IP packet data of the packets in the network to identify a flow 300. The flow 300 includes packets between a video server 120 and a client 130 The basic IP header information should be the same in the packets (except that the source and destination information is switched depending on upstream or downstream). In addition, the IP address of the video server 120 has been previously identified as a video service. The monitoring station 110 may also use machine learning or neural networks to identify a flow 300 in a media session 200.

Once the flow 300 has been identified, the monitoring station 110 identifies a start of a "chunk" in the flow 300 at 804. The start time for chunk "i" is defined herein as the arrival time of the first packet of the request message for chunk "i" observed at the monitoring station 110. Alternatively, the start time for chunk "i" is the timestamp in the first packet of the request message for chunk "i" sent in the upstream direction. In another embodiment, the chunk start time may begin at the first packet of the response message including chunk "i".

The monitoring station 110 then identifies an end of the chunk in the flow at 806. The end time for chunk "i" is defined herein as the time when the monitoring station 110 detects the last packet of the response message for chunk "i" sent in the downstream direction. Alternatively, the end time for chunk "i" is the timestamp in the last packet of the response message for chunk "i" sent in the downstream direction.

The monitoring station 110 then determines one or more chunk statistics at 808. The chunk statistics may include chunk duration, chunk size, chunk download time, chunk gap, chunk throughput, saturated chunk throughput, chunk throughput gap or network headroom for the chunk, etc.

Figure 9:
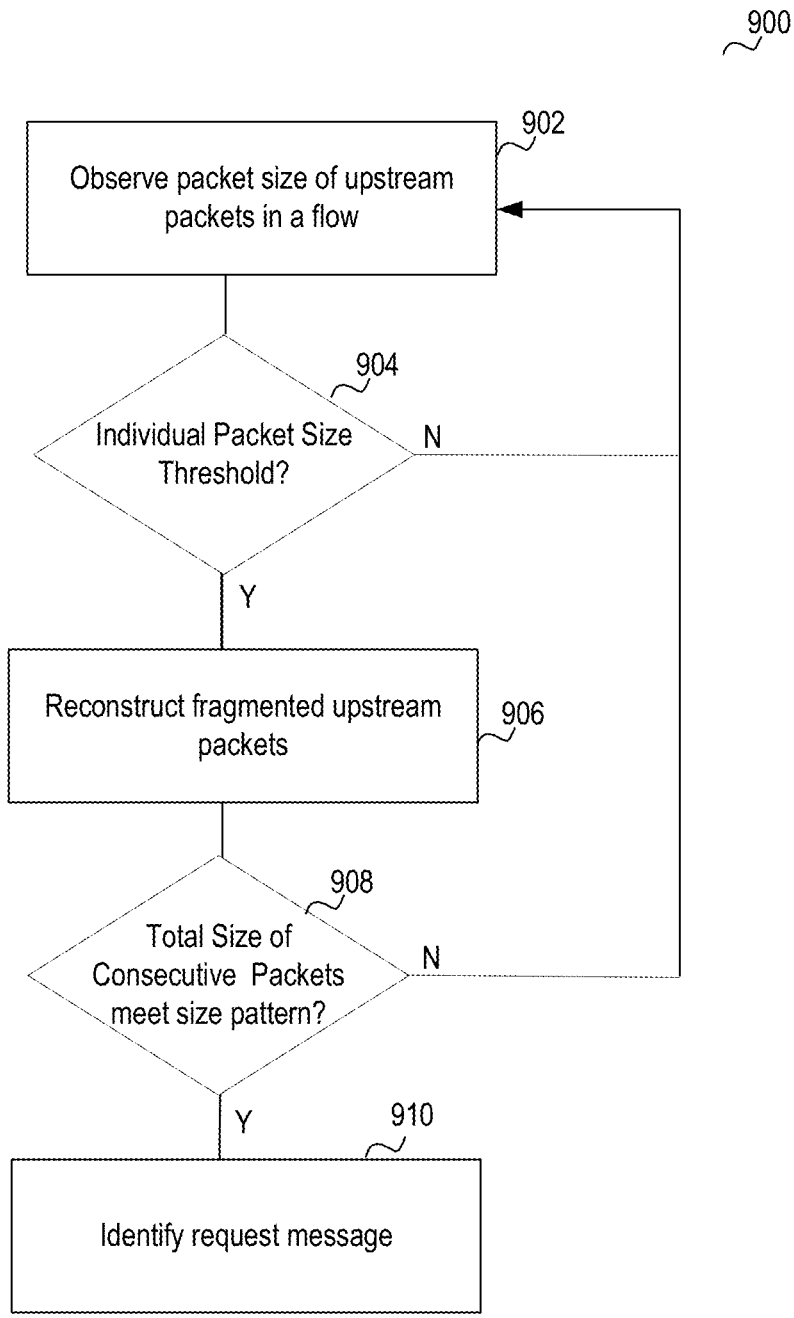
FIG. 9 illustrates a logical flow diagram of an embodiment of a method for identifying a chunk start time in a flow in a media session.

FIG. 9 illustrates a logical flow diagram of an embodiment of a method 900 for identifying a chunk start time in a flow 300 in a media session 200. This method 900 may be used to identify the start of a chunk in the flow 300 in the method 800 described above. The monitoring station 110 observes the packet size of upstream packets in the flow at 902. The monitoring station determines whether an individual packet size is greater than an individual packet size threshold. For example, the individual packet size threshold may be 300B. If so, the monitoring station reconstructs consecutive upstream packets at 906. Since IP packet fragmentation may occur in the network, the monitoring station 110 reconstructs these fragmented consecutive IP packets in the upstream direction.

The monitoring station then determines whether a total size of the consecutive IP packets meet a size pattern at 908.

The size pattern may include a lower threshold, upper threshold or both. For example, the size pattern may include a size range of 900B-1400B. The monitoring station 110 may have a different size pattern for different video service providers. The size pattern for a particular video service provider may include one or more upper and/or lower thresholds. The thresholds are determined based on an observed minimum or maximum size of request messages to the video service. The thresholds may be updated periodically by the monitoring station 110. For example, for YouTube® service, the HTTP GET message size typically ranges from 500 B-1.4 KB.

When the packet matches a predetermined size pattern at 908, the monitoring station identifies the request message at 910. Otherwise, the monitoring station 100 continues to observe the upstream packets in the flow. The monitoring station 110 may also use machine learning or neural networks to identify a request message, chunk and/or chunk start time in a flow.

FIG. 10 illustrates a logical flow diagram of an embodiment of a method 1000 for identifying a chunk end time in a flow 300 in a media session 200. This method 1000 may be used to identify the end of a chunk (i) in the flow 300 in the method 800 described above. The end of a current chunk "i" is detected when another or subsequent request message is detected in the flow. For example, the monitoring station 110 identifies a subsequent request message in the flow at 1002 and marks the start of a next chunk "i+1". The monitoring station 110 then identifies the preceding downstream packet in the flow at 1004, e.g. the downstream packet immediately preceding chunk "i+1". The monitoring station 110 identifies the end of the current chunk i as the arrival time of this preceding downstream packet. In addition, when the flow ends due to any reason, the monitoring station 110 marks the last packet in the flow 300 in the downstream direction as the end of the current chunk "i". The monitoring station 110 may perform other additional functions described herein with respect to concurrent transmissions to identify an chunk end time. For example, the monitoring station 110 may determine whether the size of the preceding downstream packet is less than a predetermined threshold (such as MTU size). If not, the monitoring station 110 may wait until it observes a packet with a size less than a predetermined threshold (such as MTU size) to identify the end of the chunk i.

Media Session QoS Metrics

FIG. 11 illustrates a logical flow diagram of an embodiment of a method 1100 for determining QoE metrics for a media session 200. The monitoring station 110 identifies one or more flows 300 belonging to a media session 200 at 1102. A video session or a media session 200 as used herein includes any video mixed with audio or simply audio or video alone. The terms video session and media session are used interchangeably herein. Identification of a plurality of flows belonging to a same media session may be determined using one or more methods, e.g. using the basic IP header information of packets during a predetermined time period, etc.

Once a plurality of flows 300 in a media session 200 are identified, the monitoring station 112 obtains chunk statistics for a plurality of chunks in the plurality of flows. The QoE metrics for the media session 200 are determined using the chunk statistics for the plurality of chunks in the flows at 1106. The chunk statistics may have been previously determined and/or be determined in real-time. The QoE metrics may be updated in real-time as additional flows are identified in the media session 200, and chunk statistics determined for one or more of the chunks in the additional flows.

One example QoE metric for a media session 200 is the average throughput over the duration of the media session (or a sliding window over the session or a fixed time period of the media session). The monitoring station 110 determines the number n of request messages or chunks in the media session 200. Assuming that there are n request messages or chunks in the video session, the session average throughput for the media session 200 may be obtained from the chunk throughput and saturated chunk throughput as follows.

$$\text{Session\_average\_throughput} = \text{sum}(\text{chunk\_throughput}(i))/n$$

wherein n=number of request messages or number of chunks

In this example, the session average throughput is determined using a sum of a chunk throughput for a plurality of chunks and the number of the plurality of chunks. Alternatively, the session average throughput may be determined from the chuck size and chunk duration as follows.

$$\text{Session\_average\_throughput} = \text{sum}(\text{chuck size}(i))/\text{sum}(\text{chunk duration}(i)) = \text{sum}(\text{chuck size}(i))/\text{session length}$$

In this alternate example, the session average throughput is determined using a sum of chunk sizes of a plurality of chunks and a sum of chunk duration for the plurality of chunks. Note that the sum of chunk duration for a session is the length of the session.

Another example QoE metric for a media session 200 session is the session saturated throughput. This session QoS metric may be determined as follows.

$$\text{Session\_saturated\_throughput} = \text{sum}(\text{saturated chunk\_throughput}(i))/n$$

wherein n=number of request messages or number of chunks

The session saturated throughput is obtained from the sum of the saturated chunk throughput of a plurality of chunks and the number n of chunks or request messages. Alternatively, the session saturated throughput may be determined from the chuck size and chunk download time as follows.

$$\text{Session\_saturated\_throughput} = \text{sum}(\text{chuck size}(i))/\text{sum}(\text{chunk download time}(i))$$

In this alternate example, the session saturated throughput is determined using a sum of chunk sizes of a plurality of chunks and a sum of chunk download time for the plurality of chunks. The saturate session throughput may also be determined from an average of chunk saturated throughput for the plurality of chunks in the session.

Yet another example QoE metric for a media session 200 is the session_throughput_gap, also referred to as the network headroom. The session throughput gap is the difference between the two session throughput values as follows:

$$\text{Session\_throughput\_gap} = \text{session\_saturated\_throughput} - \text{session\_average\_throughput}$$

The session throughput gap is a good indicator of the extra capability or bandwidth that the network may provide to the media session 200. The session throughput gap provides a measurement of the network capacity "headroom" for the media session 200. As a result, we also call session throughput gap as network headroom for the session.

Because the session saturated throughput metrics are based on a chunk level throughput instead of a flow level throughput, the session throughput gap more accurately captures the effect of the DASH protocol for chunk delivery. As such, the session throughput gap is an improved measurement of an amount of the network throughput that may be used by the media session 200. The identification of chunks and determination of chunk statistics provides the basis for these improved session level QoS metrics.

The example QoS metrics are described above for the entire duration of a media session 200. However, the average and saturated throughput, as well as throughput gap or network headroom may be determined for a sliding window over the media session 200 or a fixed time period of the media session 200. The determinations are made using the chunk information for the desired period of time.

Note that for the QoS metrics, the session throughput values are calculated over a plurality of chunks in the session. The inaccuracies resulting from chunk detection can thus be absorbed by the averaging process, e.g. because the total size of the downstream packets are calculated accurately. As such, when hundreds of chunks are identified in a media session, misidentifying an end of a few chunks becomes statistically insignificant. For example, a short video session in the range of a few minutes typically has hundreds of chunks. Thus, the misidentification of a few chunks has little effect on the average chunk statistics over the entire video session.

The monitoring station 110 may use varying technologies to obtain the QoE metrics for the media session 200. For example, the monitoring station 110 may implement Machine Learning or neural network type vectors and algorithms to identify chunks and associate the chunk information in a session with any session level information indicating a QoE metric.

The monitoring station 110 is thus able to perform real-time, in-network chunk detection using basic IP packet data collected from examination of IP packet headers. Unlike other existing techniques that require examination of IP packet payload (such as DPI), the chunk detection methods described herein are applicable to any protocol that supports the chunk request from the client and the corresponding response from the server. Furthermore, it is also applicable to encrypted IP traffic or to unencrypted IP traffic.

Determination of Playback Bitrates

The playback bitrate during a media session is a good indicator for the quality of the media session 200 experienced by the user. However, during playback, a media session 200 may have various playback bitrates. As such, it is important to determine the various playback bitrates for a media session 200 to measure the entire user experience. In a current study, video quality is based on an average resolution over the duration of the video session, e.g., an average of a low (LD), standard (SD) or high definition (HD). This current study is based on observed content of HTTP requests. This current study only estimates one average resolution for an entire video session. It cannot capture the fact that a video session may have multiple resolutions and download bit rates during its playback.

In an embodiment described herein, the monitoring station 110 is configured to determine a playback bitrate for different portions of a media session 200. In particular, the monitoring station 110 determines different region of times when a video session operates in a unique state (buffering state or steady state or draining state) and identifies the state changes in a video session. The monitoring station 110 also determines the download bitrate for the different states in the video session. Thus, the monitoring station 110 detects a plurality of session states (e.g., buffering, steady, draining) and determines a playback bit rate for each of the plurality of session states.

The session state detection described herein applies to any type of video delivery protocol (such as DASH-MPEG, DASH-3GPP, etc.) in which the client requests video content on a chunk by chunk basis from a video server or servers. For example, DASH using HTTP or HTTPS is such an example video delivery protocol. The session state detection described herein may apply to other adaptive bit rate protocols as well.

Session Construction

The monitoring station 110 identifies or groups a plurality of flows belonging to a same video session. A number of heuristic algorithms may be implemented for session identification. In one embodiment, the monitoring station 110 includes address information for video servers provisioned by one or more video services. For example, YouTube® audio and video asserts are currently delivered mostly from servers in the form of *.googlevideo.com. The monitoring station 110 further includes address information for web servers provisioned by one or more video services, wherein the web servers provide web objects, such as HTML, scripts and images.

From a given client device, the monitoring station 110 identifies requests to and responses from one of the plurality of web servers of a video service to determine the start and/or end of a media session. In addition, from a given client device, the monitoring station 110 identifies requests to and responses from one of the plurality of video servers of a video service, e.g. for chunk detection as described herein. The monitoring station 110 may use a timeout value to identify an end of a media session as well.

State Change Detection in a Media Session

The monitoring station 110 determines a plurality of flows belonging to a same media session. Using the chunk detection methods described herein, the monitoring station 110 identifies chunk start times for a plurality of chunks in a flow. Using these chunk start times, the monitoring station 110 may generate a sequence of chunks for the flow. The chunks in the plurality of flows in the media session may then be ordered according to the strictly increasing start time of a chunk. The chunks are labeled with an order number "i" (wherein i>=1). The order number i of the chunk identifies where a chunk is located with respect to other chunks in time during a flow in the media session. After ordering the chunks in the session, a state (buffering or steady) of the media session may then be determined.

As described with respect to FIG. 2, during a buffering state of a media session, the client 130 requests chunks from the video server 120 one after another with little to no delay. As a result, the chunk gap between chunks is very small or close to zero. In contrast, during steady state, the client 130 requests chunks from the server 120 at a rate similar to the playback bitrate. In addition, during steady state, the chunk duration is similar to the playback time for the chunk. Assuming the available network bandwidth is higher than the playback bitrate, then the chunk download time ends before the chunk duration. As a result, "quiet periods" are observed wherein no bandwidth is used. These quiet periods lead to relatively larger average chunk gaps in steady state compared to the buffering state.

Figure 12:
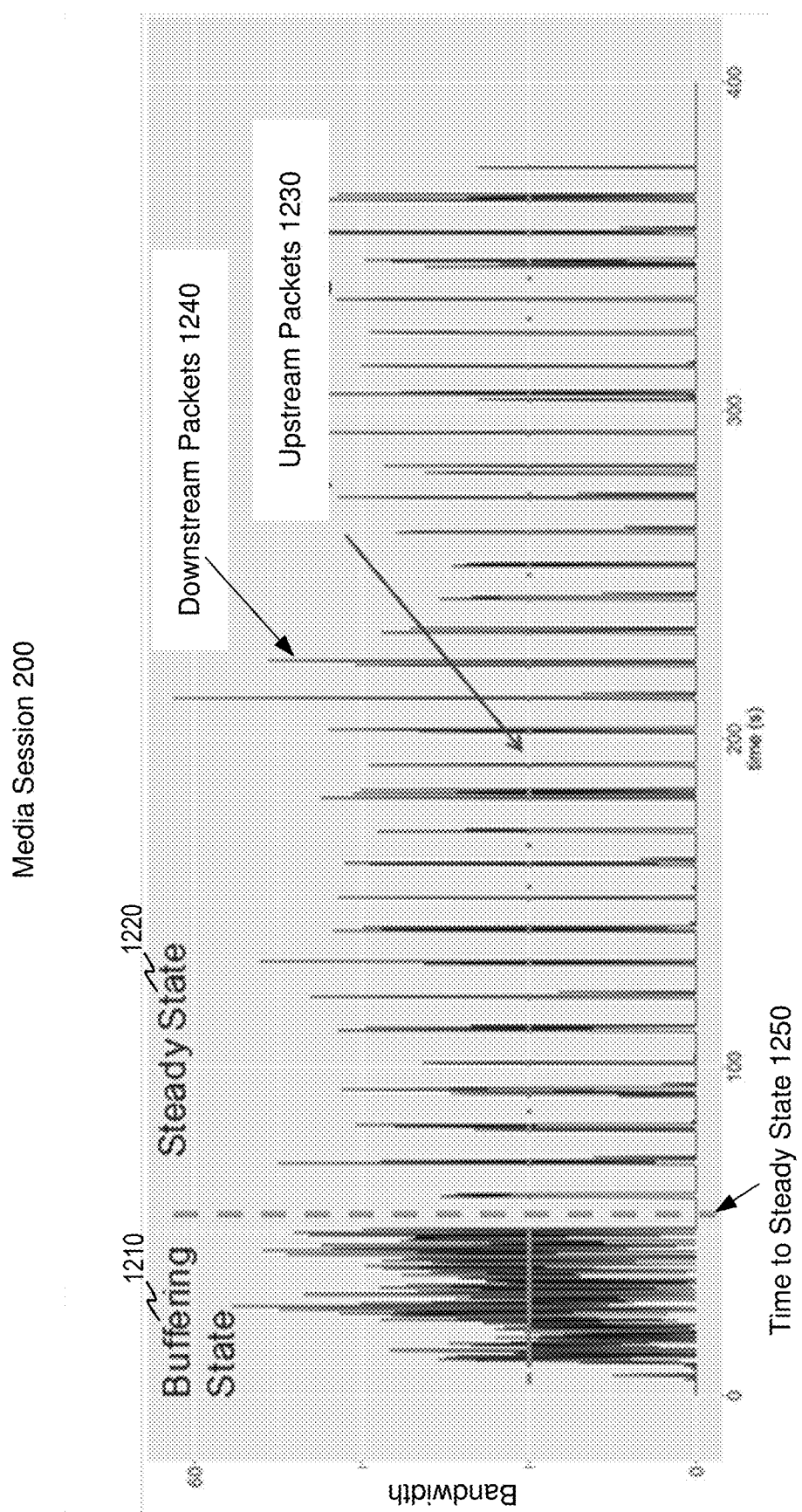
FIG. 12 illustrates a graphical representation of session states in a media session.

FIG. 12 illustrates a graphical representation of session states in a media session 200. The graphical representation is an example of experimental data obtained during a media session 200 between a client 130 and a video server 120 in a popular video service. The monitoring station 110 detected packets in one or more flows of the media session and provided this graphical user interface (GUI) on a display. The graph shows the bandwidth over time of the downstream packets 1240 and upstream packets 1230.

The media session 200 exhibits two states: a buffering state 1210 followed by steady state 1220. During the buffering state 1210, the chunk gap of the downstream packets is smaller, e.g. close to zero, while during steady state 1220, the chunk gap is more similar to the chunk duration. In an embodiment described herein, the monitoring station 110 identifies the state of the media session 200 using measurements of the chunk gap. The monitoring station 110 thus detects a state change in the media session 200 using the behaviour of chunk gap over the media session 200. For example, the monitoring station identifies a steady state when one or both conditions below hold.

$$\text{Chunk\_Gap}(i)/\text{Chunk Duration}(i) > L\_\text{Rel\_chunk\_gap}$$

$$\text{Chunk\_Gap}(i) > L\_\text{Abs\_chunk\_gap}$$

wherein $L\_\text{Rel\_chunk\_gap}$ is a relative value for a first low chunk gap threshold and $L\_\text{Abs\_chunk\_gap}$ is an absolute value of a second low chunk gap threshold. The first condition indicates that the chunk gap of a chunk i divided by the chunk duration of the chunk i exceeds a first chunk gap threshold. And the second condition indicates that the chunk gap of the chunk i exceeds a second chunk gap threshold.

The monitoring station 110 determines and stores predetermined chunk gap threshold values for various different conditions or factors. For example, the chunk gap threshold values may be based on average chunk gaps observed for known steady states of media sessions for a video service. The chunk gap threshold values may be set differently in different networks and for different video services. The threshold values may also depend on device type, video service, network, etc.

The monitoring station 110 thus uses observed chunk gaps to determine a time to steady state 1250 in the media session 200. Though this example includes a single buffering state 1210 and steady state 1220, the media session 200 may cycle through multiple buffering states and steady states. The monitoring station 110 may continuously monitor chunk gaps to detect any changes back from steady state to buffering state. Using chunk gap measurements, the monitoring station 110 may thus detect a state change in real-time at the end of each chunk.

Quality Metrics in Steady State

After detection of a steady state, the following metric can be determined for the duration of the steady state region:

$$\text{Avg\_Download\_BitRate} = \text{Avg\_over\_}i[\text{Chunk\_Size}(i)/\text{Chunk\_Duration}(i)]$$

The monitoring station 110 thus determines an average download bit rate during steady state using an average of chunk size divided by chunk duration for a plurality of chunks. The monitoring station 110 may also determine an average download bitrate in steady state from the following.

$$\text{Avg\_Download\_Bitrate} = \text{sum of downstream packet size}(i) \text{ in steady state/time in steady state}$$

The monitoring station 110 may also determine the average download bit rate during steady state using the sum of the packet sizes for the downstream packets and the total time in steady state.

The average download bit rate in steady state is then equated to the average playback bitrate. This determination of the average playback bitrate during the steady state of the media session 200 is more accurate. Next, assuming that the video content has a same resolution during the entire media session, then the average playback bitrate during steady state represents the average playback bitrate for the entire session as well.

Figure 13:
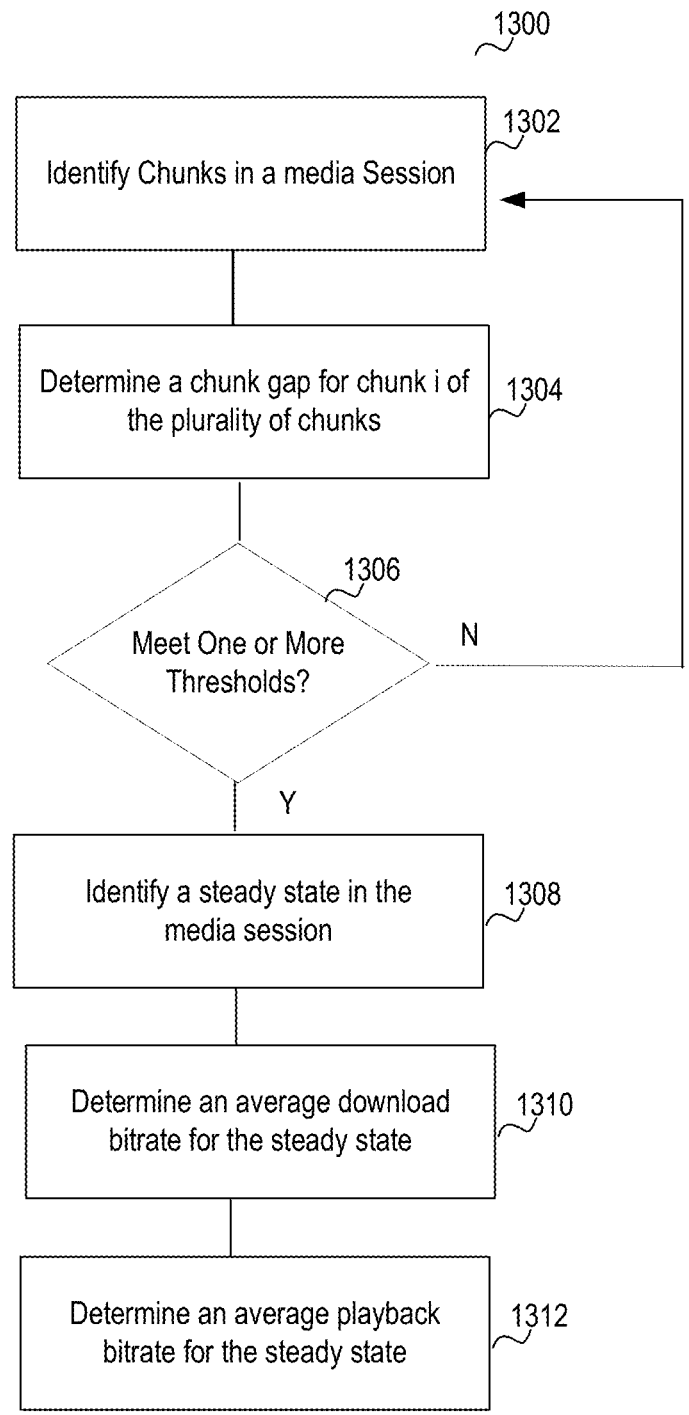
FIG. 13 illustrates a logical flow diagram of an embodiment of a method for determining an average playback bitrate of a media session.

FIG. 13 illustrates a logical flow diagram of an embodiment of a method 1300 for determining an average playback bitrate of a media session 200. The monitoring station 110 detects a steady state of a media session using chunk detection and chunk gap measurements. For example, the monitoring station 110 identifies chunks in a media session at 1302. The monitoring station 110 determines a chunk gap for a chunk i of the plurality of chunks at 1304. The monitoring station 110 then determines whether the chunk gap meets one or more predetermined chunk gap threshold values at 1306. If not, the monitoring station continues to monitor chunks at 1302. If so, the monitoring station 110 identifies a start of a steady state for the media session at 1308. Though one chunk gap is described herein, the monitoring station 110 may require that a chunk gap or average chunk gap over two or more chunks meets the chunk gap thresholds.

The monitoring station 110 may also determine the buffering state of the media session from the start of the media session 200. The start of the buffering state may be set as the start of the first chunk in the media session 200 and the end of the buffering state may be set at the start of the steady state following the previous buffering state.

The monitoring station 110 then determines an average download bitrate for the steady state at 1310. This average download bitrate is used to determine the average playback bitrate for the media session at 1312. The average download bitrate during steady state may be equated to the average playback bitrate for the entire media session. When multiple steady states occur during a media session, the average bit rate may be determined for each steady state. These averages may then be averaged to determine an average bit rate for the media session 200.

Figure 14:
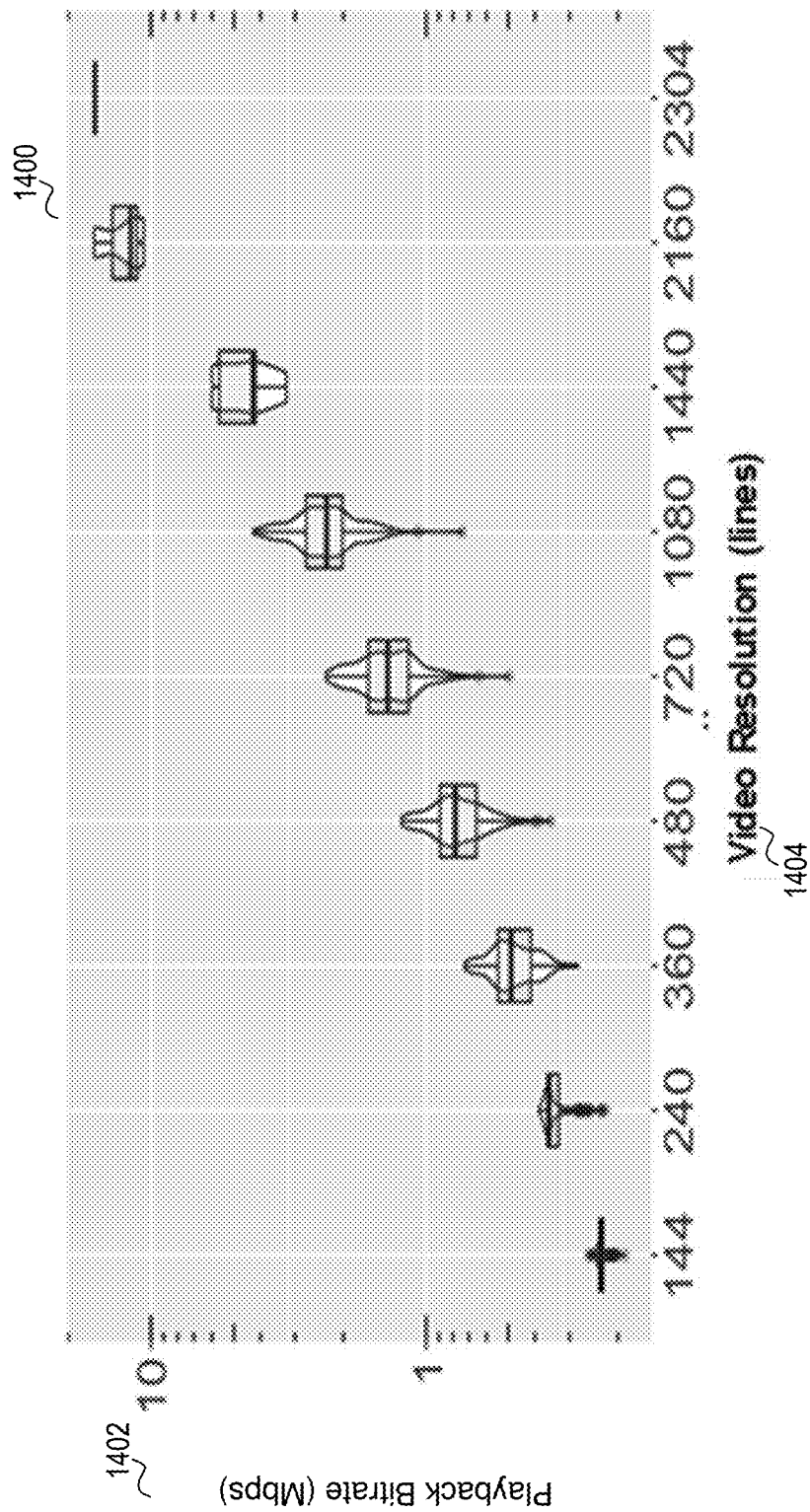
FIG. 14 illustrates a graphical representation of a distribution of playback bitrates for each of plurality of video resolutions of video assets of a video service.

FIG. 14 illustrates a graphical representation of a mapping 1400 of average playback bitrates 1402 to known video resolutions (e.g., 144$p$ to 2304$p$). The mapping 1400 is derived from popular video assets of a video service at each of the video resolutions. The graphical representation 1400 is an example of experimental data obtained during a plurality of media sessions between clients and video servers of a popular video service, wherein the video resolutions were independently measured or known. For each video resolution, the playback bitrate for each of a plurality of popular video assets was measured. The popular video assets included a top number of the most downloaded videos from the video service (such as top 100 videos). For each of a set of known video resolutions, the monitoring station 110 measures a distribution of ranges of average playback bitrates using the size of the video content in a given resolution divided by the length of the session.

This mapping 1400 demonstrates that a range of average playback bitrates 1402 may be correlated to one of a set of standard video resolutions 1404 for a given video service. For example, using the mapping 1400, an average playback bitrate in Mbps in the range of 0.5 to 1 corresponds to a video resolution of approximately 480p for this video service. The p stands for progressive scan or a vertical resolution of 480 lines. In another example, the average playback bitrate in Mbps in the range of 5-7 Mbps corresponds to a video resolution of approximately 1440p.

The mapping 1400 may be updated periodically (hourly, daily, etc.) for each of a plurality of video services using their top or most downloaded video assets. The mapping may alternatively be provided by a video service. The mapping 1400 may then be stored as a graph, table or using other correlation means. The mapping 1400 may also be generated for different network types (WLAN or LAN, cellular, etc.), client platforms, etc. The bitrate ranges may even change if encoding time is different even for the same video resolution. Thus various mappings may be performed for a more accurate estimation of video resolution.

Figure 15:
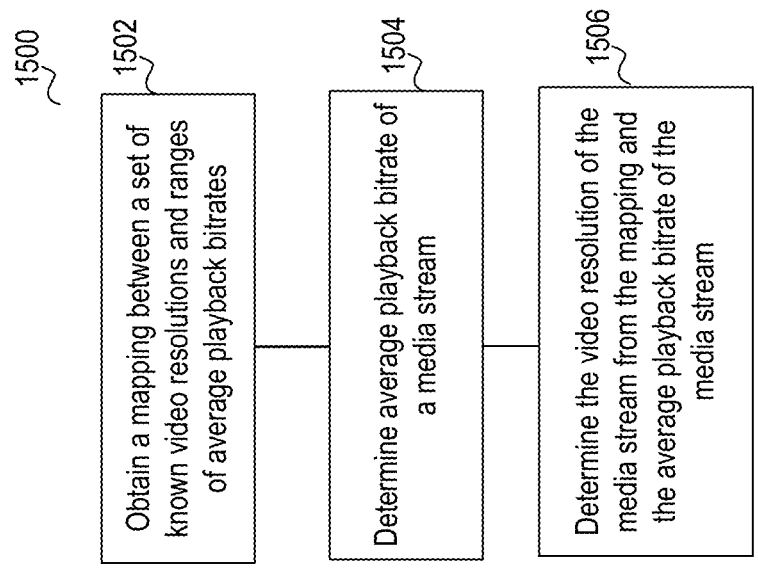
FIG. 15 illustrates a logical flow diagram of an embodiment of a method for determining a video resolution of a multimedia stream.

FIG. 15 illustrates a logical flow diagram of an embodiment of a method 1500 for determining a video resolution of a media session 200. The monitoring station 110 obtains a mapping between a set of known video resolutions and ranges of average playback bitrates for each video resolution. The monitoring station 110 then determines an average playback bitrate of a media stream between a client 130 and a video server 120 of the video service at 1504. The monitoring station 110 accesses the mapping between the set of known video resolutions and ranges of average playback bitrates for each video resolution for the particular video service. The monitoring station then determines the video resolution using the mapping for the particular video service and the determined average playback bitrate of the media stream at 1506.

Quality Metrics using Chunk Size

During the buffering state, the download bitrate does not correlate to the average playback bitrate. In fact, no conclusions regarding the relationship between the playback bitrate and the observed download bitrate may be made in the buffering state. The client is requesting chunks as fast as possible, that is, as fast as the network is able to deliver to increase its buffer occupancy. The playback bitrate can be either higher or lower or equal to the download bitrate depending on the network condition.

In an embodiment described herein, chunk size information is used to obtain a video resolution or playback bitrate. Regardless of network condition, when a chunk of a given quality or resolution is requested, its chunk size remains constant in the various regions of the media session (buffering state or steady state). The chunk size may thus be used to estimate a video resolution during buffering state. The monitoring station 110 may thus determine information relating to a chunk size, such as an average chunk size or mean chunk size, during the buffering state and use this chunk size information to estimate a video resolution. For example, the following may be used to estimate a playback bitrate during a buffering state:

Average_Chunk_Duration in steady state=Average Chunk Playback Duration in buffering or steady state The monitoring station 110 assumes that the average chunk duration in steady state equals the average playback duration of a chunk in steady state and the buffering state (e.g. assuming a relatively constant chunk playback duration for the session). From the chunk duration, the playback bitrate of a chunk in a buffering state is then:

Playback Bitrate in buffering state=(Chunk_Size in buffering state)/(Chunk_Duration in steady state)

Using the obtained average chunk duration in steady state, and a measured chunk size in a buffering state, the playback bitrate in the buffering state may be obtained. The monitoring station 110 may then determine a video resolution for the buffering state using the distribution graph 1400 for the video service. In this embodiment, the monitoring station 110 must wait for a steady state to measure the chunk duration in steady state.

In another embodiment, average or typical chunk duration may be obtained for a video service, such as a YouTube® video service. An average chunk duration may be observed for each of a plurality of video services. The chunk duration for top video assets are measured and used to determine a playback bitrate in a buffering rate.

Though the above method is described for the buffering state, the chunk size in steady state may also be used to determine a playback bitrate in the steady state. In this case, the playback bitrate may be obtained from the following.

Playback Bitrate in steady state=(Chunk_Size in steady state)/(Chunk_Duration in steady state)

The monitoring station 110 may thus determine the playback bitrate in steady state from the chunk size and chunk duration in steady state or from the average download bitrate in steady state.

Figure 16:
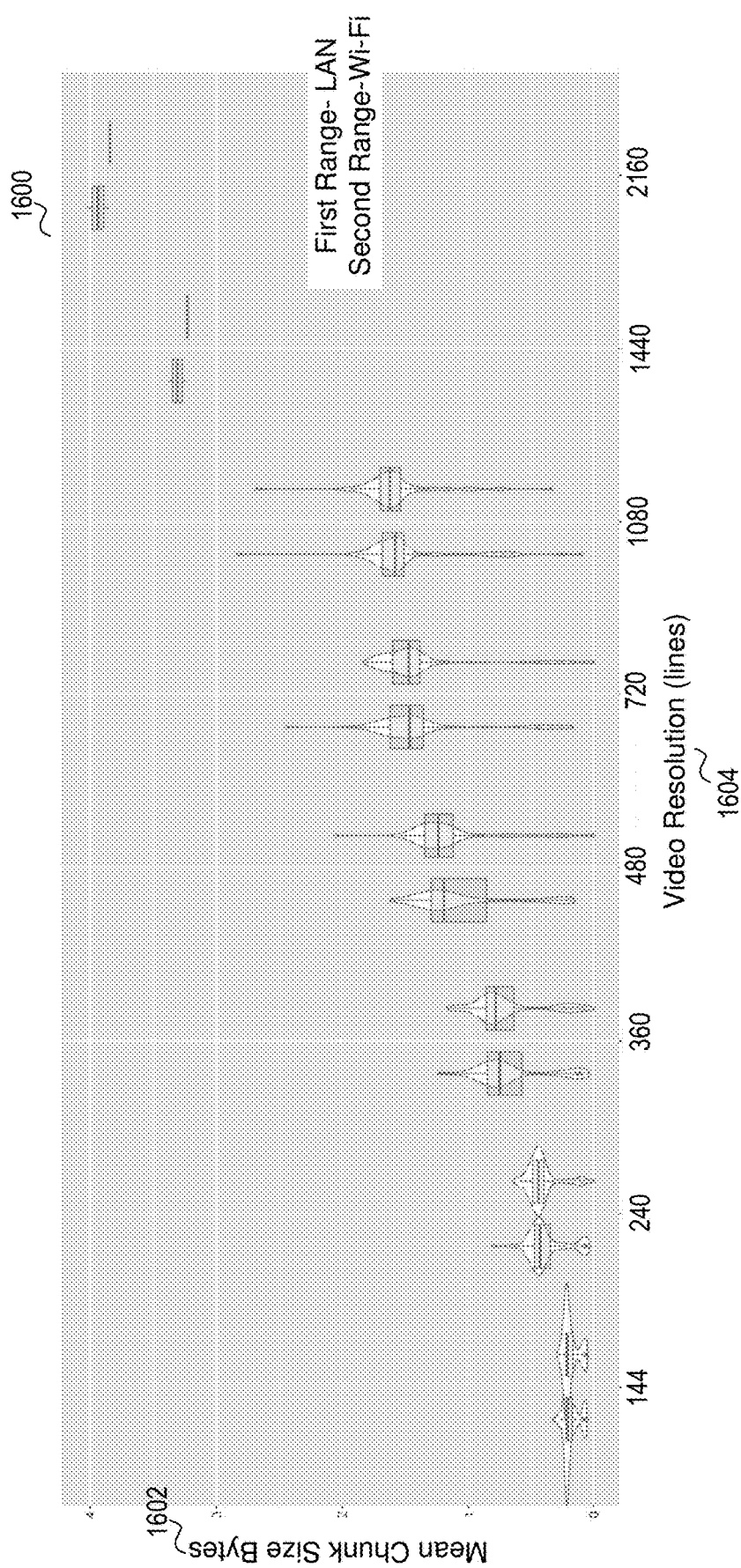
FIG. 16 illustrates a graphical representation of a distribution of mean chunk sizes for each of plurality of video resolutions of video assets of a video service.

FIG. 16 illustrates a graphical representation of a mapping 1600 between ranges of mean chunk sizes 1602 and a set of video resolutions (e.g., 144p to 2160p) of a video service. The graphical representation 1600 is an example of experimental data obtained during a plurality of media sessions between clients and video servers of a popular video service, wherein the video resolutions were independently measured or known. For each video resolution, a range of mean chunk sizes for each of a plurality of popular video assets was measured over a wired LAN and a Wi-Fi network (e.g., a wireless local area network compliant with an 802.11 standardized protocol). For example, a video service may publish a set of its supported video resolutions. Each of the supported video resolutions for each of the popular assets of the video service is then tested to determine a mean chunk size. The popular video assets include, e.g., a top number of the most streamed videos from the video service (such as top 100 videos). From this data, the monitoring station 110 may obtain a mapping between ranges of mean chunk sizes and a set of video resolutions for a given video service. A mapping may be performed for each of a plurality of video services, network conditions, client platforms, etc. The mapping may include a graph, a reference table, or other correlation means. The mapping 1600 is preferably updated periodically (hourly, daily, etc.). Alternatively, the mapping 1600 may be provided by a video service.

The monitoring station 110 then obtains a video resolution of a media session using the mapping and a measured mean chunk size of the media session. For example, from the graph 1600, a measured mean chunk size of a media session in a Wi-Fi network of around 0.6 to 0.8 MB has a video resolution of 360p.

Alternatively to mean chunk size, other size measurements of chunks may be correlated to a set of video resolutions for a given video service. For example, an average chunk size, median chunk size or other chunk size information may be correlated to a set of video resolutions for a given video service.

Figure 17:
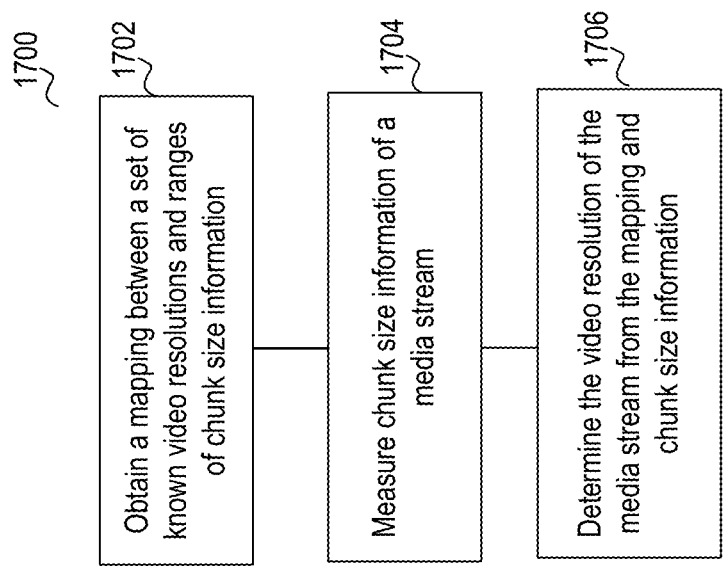
FIG. 17 illustrates a logical flow diagram of an embodiment of a method for determining a video resolution of a multimedia stream using chunk size information.

The mechanisms described regarding a media session are valid for audio even though examples herein are shown for video. For example, the media session can be audio only, video only, or mixture of audio and video chunks. All the measurements and statistics may be provided for video as well as audio. For a video only session, video resolution is an important QoS measurement, and for an audio only session, audio playback bitrate is an important QoS measurement. The audio chunk size or bit rate may be mapped to an audio encoding. For a video session composed of a mixture of audio and video chunks, both measurements are important and can be determined using these mechanisms. audio chunk size or bit rate and map it to an audio codec FIG. 17 illustrates a logical flow diagram of an embodiment of a method 1700 for determining a video resolution of a multimedia stream using chunk size information. The monitoring station 110 obtains the mapping between a set of known video resolutions from a video service and ranges of a chunk size measurement, such as mean chunk size, average chunk size, etc. at 1702. The monitoring station 110 then measures the chunk size information of a multimedia stream between a client and a video server of the video service at 1704. Using the mapping for the video service, the monitoring station 110 determines a video resolution using the chunk size information at 1706.

The state detection mechanism is a fundamental building block in the media session QoE measurement framework, as playback bitrate can be detected during steady state of a session. In addition, chunk size statistics can be used to infer playback bitrate during buffering state. With more accurate estimate of playback bitrate during different session states, more accurate QoE metrics are obtained for the session.

Assuming the media session has a single video resolution or quality, the average playback bitrate measured during steady state may be equated to the video resolution over the entire duration of the media session. In addition, assuming that the entire video session has a constant quality or resolution, then the representative video resolution or quality of the video session may be determined from the steady state. However, if a media session never enters a steady state, then a mean chunk size or other chunk size information may be used to determine a video resolution for the media session.

The buffer size in media players between different client devices may vary and may even be altered within a single client device. In addition, playback of a media session may begin when the buffer reaches some unique upper threshold that is not standardized. As such, it is difficult to determine an exact time to start of playback 260, as marked by T1 in FIG. 2. However, the time it takes for a client to retrieve a certain amount of video content may be more accurately determined. This metric is referred to as the "time to first F bytes" wherein F is a configurable parameter.

Rather than inaccurately estimating "T1=time to start of playback", the time to first F bytes may be determined and reported (either before or after the actual time to start of playback).

In addition, it is difficult to determine user actions other than linear playback of the chunks retrieved. Such actions include fast-forward, rewind, and any change of playback position in the asset. Therefore, it is assumed that the end user playbacks the video content in the order of chunks retrieved. Naturally any deviation of user activities from this assumption may result in inaccuracies of various metrics herein.

Note that when the monitoring station 110 detects the end of the media session, the client can either playback all or some of the chunks stored in its buffer, or simply stops the playback, there is no way to determine when the playback of the video content finishes at the client. If we assume the client plays out some chunks already stored in its buffer, then at the end of a media session 200 it enters "draining state". The maximum duration of the draining state is the playback duration of the chunks that can be stored in a client buffer. This is called "buffer size measured in seconds". This value varies across clients and services.

The monitoring station 110 performs functions at various levels. At the session level, the monitoring station 110 is configured to group one or more IP flows constituting a single media session together. At the IP flow level, the monitoring stations 110 processes IP packets, in real-time, detects chunks using one or more of the "Chunk Detection" mechanisms described herein and generates metrics describing the behaviour of each chunk, e.g. in real-time as the end of a chunk is detected.

At the chunk level, the monitoring station 110 detects state changes (buffering and steady state) during a media session, e.g. in real-time as the end of a state is detected using a measured chunk gap. The monitoring station 110 generates QoE metrics specific for each of the plurality of states. In one example, the monitoring station 110 reports the time instance the session enters steady state for the first time after the initial buffering state. In FIG. 2, the time to steady state 270 is marked as T2. In another example, it detects the average resolution used in the state.

As resolution changes may occur at any chunk boundary independent of state change of the media session, the monitoring station 110 may determine a resolution change using mean chunk size or average playback bitrate. The monitoring station 110 may identify the chunk boundary, e.g., the chunk at the end of which a resolution change-up (or increase) or change-down (or decrease) occurs. At the chunk level, the monitoring station 110 may also detect a chunk whose appearance coincides with the beginning of a stall in the playback observed by the end user.

In general, Machine Learning (ML) algorithms or neural networks may be implemented to help in the performance of or to perform one or more functions described herein or to obtain or help to obtain one or more measurements or metrics described herein.

Figure 18:
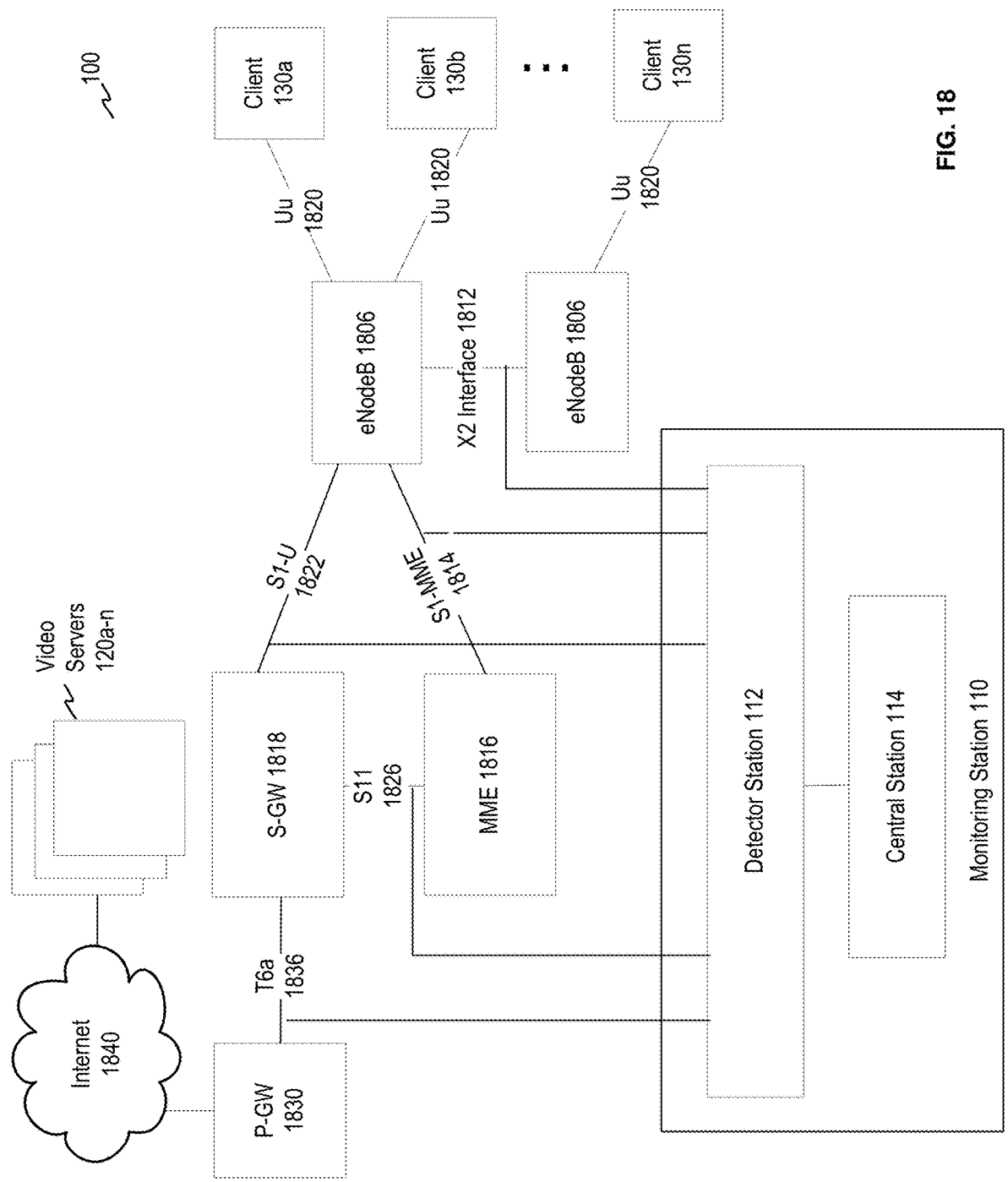
FIG. 18 illustrates a schematic block diagram of an embodiment of a monitoring station in a wireless network.

FIG. 18 illustrates a schematic block diagram of an embodiment of a monitoring station 110 in a wireless network. The wireless network 100 may include various type of cellular networks including, but not limited to, the Universal Mobile Telecommunications System (UMTS) Terrestrial Radio Access Network (UTRAN), Long Term Evolution (LTE) Evolved UTRAN (E-UTRAN), LTE-Advanced (LTE-A) or other long range wireless networks. In one implementation in which the wireless network 100 is an LTE type cellular network, the overlay access network includes an evolved Universal Terrestrial Radio Access Network (E-UTRAN) connected to an evolved packet core (EPC). The E-UTRAN includes at least one Universal Terrestrial Radio Access Network (UTRAN) node B or eNB or eNodeB 1806. The eNodeBs 1806 are interconnected with each other in the E-UTRAN by means of an X2 interface 1812. The eNodeBs 1806 provide an air interface (I/F) to clients 130*a-n* using a Uu signalling protocol 1820. In other embodiments, different types of radio access networks (RAN) may be implemented, e.g. a base transceiver station (BTS) and radio network controller (RNC).

The eNodeBs 106 are connected by means of an S1 interface 1814 to the packet core network, and more specifically to a Mobility Management Entity (MME 1816) by means of the S1-MME protocol interface 1814, to a Serving Gateway (S-GW) 1818 by means of the S1-U protocol interface 1822. The S-GW 1818 routes and forwards user data packets, while also acting as the mobility manager for the user plane. The S-GW 1818 communicates with a Packet Gateway (P-GW) 1830 over a T6a interface 1836. The P-GW 1830 may be connected to a wide area network (Internet) 1840, application server, etc. For example, the P-GW 1830 may be communicatively coupled via the Internet 1840 to a plurality of video servers 120*a-n*.

The detector station 112 is deployed within the packet core of the wireless network and monitors packets transmitted over one or more of the interfaces between the network elements. The detector station 112 is able to monitor the packets exchanged between mobile-to-mobile, mobile-to-Internet and Internet-to-mobile sources and destinations. For example, the detector station 112 may monitor packets transmitted over one or more of the T6a 1836 interface, the S1-U interface 1822, S1-MME interface 1814 or the X2 interface 1812.

The detector station 112 auto-discovers the network and maps the path of each packet through the network. It generates "events" based on observed behaviours and generates flow records including basic IP data for packets in flows. For example, the flow records include the basic IP data for DASH-HTTP or DASH-HTTPS packets in a media session. The detector station 112 may monitor the media sessions between the client devices 130*a-n* and the plurality of video servers 120*a-n*. The flow records include the individual devices and packets in the flows, including their basic IP packet data from packet headers.

The one or more deployed detector stations 112 securely communicate the flow records to the central station 114. The central station 114 provides a GUI access to the detector stations 112, reports, forensics, and control. The central station 114 may provide a real-time dashboard visibility including the chunk statistics and QoE metrics of the media sessions. Operators may access the dashboard using a graphical user interface and generate real-time or periodic reports relating to chunk statistics and the QoE metrics of media sessions. The operators may also manage and control the detector stations 112.

Figure 19:
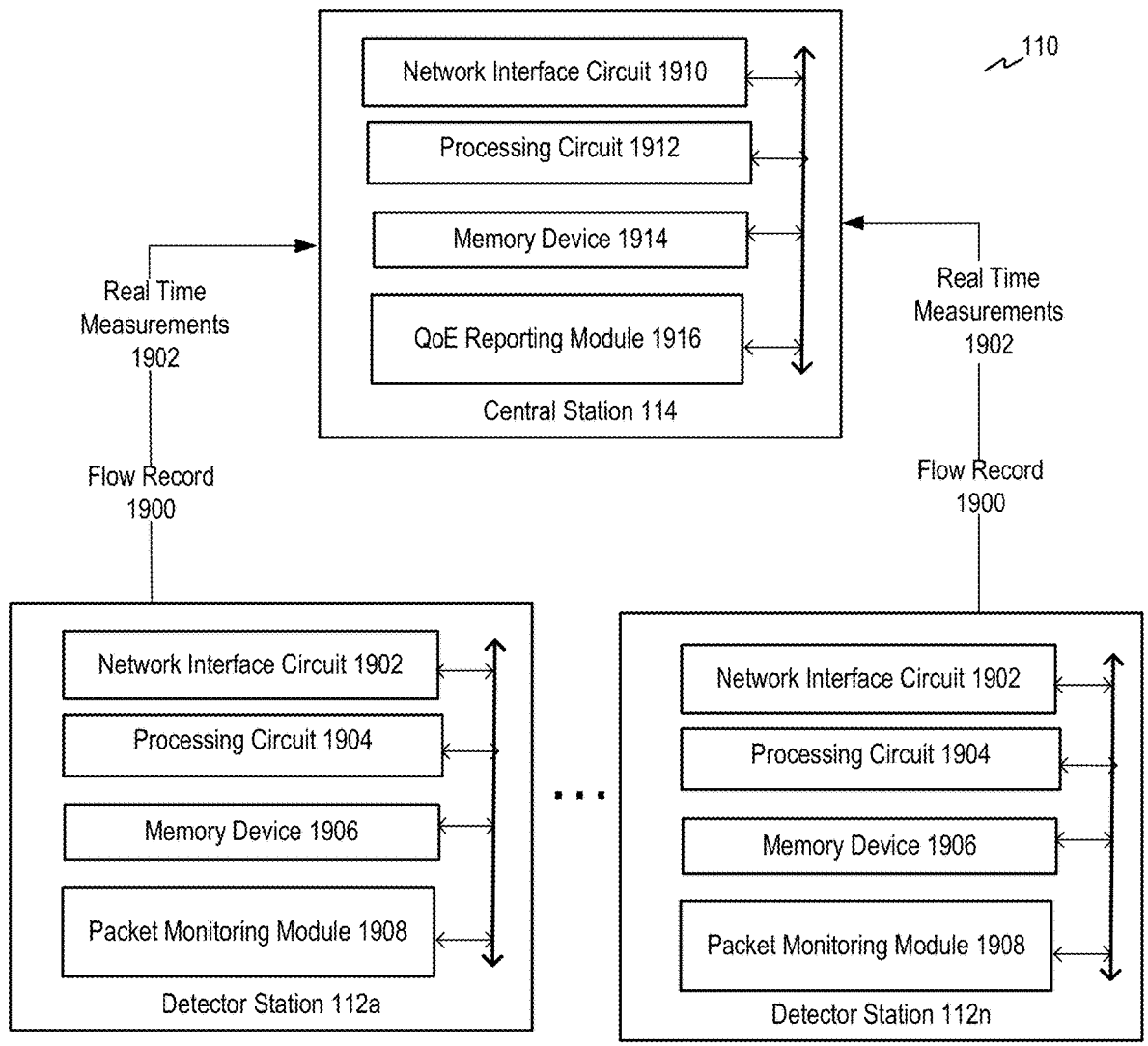
FIG. 19 illustrates a schematic block diagram of an embodiment of the monitoring station in more detail.

FIG. 19 illustrates a schematic block diagram of an embodiment of the monitoring station 110 in more detail. In an embodiment, the monitoring station 110 includes two types of components: detector stations 112*a-n* and a central station 114. The detector stations 112*a-n* are deployed in a service provider network and provide flow records 1900 to the central station 114. Each of the detector stations 112 includes at least one network interface circuit 1902, at least one processing circuit 1904 and at least one memory device 1906.

The network interface circuit 1902 communicates with network elements and receives a copy or mirror of packet transmitted over various network interfaces. In one aspect, the memory device 1906 includes one or more non-transitory processor readable memories that store instructions which when executed by the one or more processing circuits 1904, causes the one or more processing circuits 1904 to perform one or more functions described herein.

The packet monitoring module 1908 monitors the packets within the network and generates the flow records 1900. The flow records 1900 may include real-time flow information including the source/destination pair by IP and/or other identification information (such as International Mobile Station Equipment Identification (IMEI)/International Mobile Subscriber Identification (IMSI)). The flow records include bidirectional flow information with the following exemplary fields for a mobile network:

Basic IP packet data (5-tuple)—orig_ip, orig_port, resp_jp, resp_port, protocol

Source/Destination Pair identifier information—such as IP address or IMSI/IMEI

Wireless network elements to which the mobiles are attached

Arrival time of the first packet/last packet in each direction

Packet/byte counts in each direction

Airtime usage

Connection setup counts

The packet monitoring module 1908 may also identify the flows within a media session, identify chunks within a flow, determine chunk statistics, identify states within the media session, determine QoE metrics for the flow or media session, or perform other functions or methods described herein. The packet monitoring module 1908 may determine and report these measurements in a flow in real-time while the monitoring station observes packets in the media session. For example, the detector stations 112*a-n* may transmit real time measurements 1920 to the central station 114. In addition, the flow records 1900 may include this information. The flow records are transmitted by the detector stations 112*a-n* to the central station 114 as well.

The central station 114 includes a network interface circuit for communicating with the one or more detector stations 112*a-n*. The central station 114 also includes a processing circuit 1912 and memory device 1914. In one aspect, the memory device 1914 includes one or more non-transitory processor readable memories that store instructions which when executed by the one or more processing circuits 1912, causes the one or more processing circuits 1912 to perform one or more functions described herein.

The central station 114 further includes a QoE reporting module 1916. The QoE reporting module 1916 may collate the real-time measurements 1902 and provide a real-time report on a media session while the media session is still occurring. The monitoring station 110 thus performs real-time detection as packets are observed by the detector stations.

For example, the real-time statistics may include one or more of the metrics of a current media session: video service, client device, application flow quality, network path, download bitrate, playback bitrate, video resolution, chunk statistics and an overall score for QoE. Alternatively or in addition to the detector stations 112, the central station 114 may identify the flows within a media session, identify chunks within a flow, determine chunk statistics, identify states within the media session, determine QoE metrics for the flow or media session, or perform other functions or methods described herein in real-time, e.g. as the media session is occurring.

Though the central station 114 and detector station 112 are described as separate devices, the components may be implemented in a single device or over any number of devices. Though various elements are marked with a number "n" or a number "m" herein, the actual number n or the number m of the elements are independent. For example, the number of detector stations 112*a-n* is independent from other elements marked with a number "n".

A processing device or applications processing device as described herein includes at least one processing device, such as a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. A memory device is a non-transitory memory device and may be an internal memory or an external memory, and the memory may be a single memory device or a plurality of memory devices. The memory device may be a read-only memory, random access memory, non-volatile memory, static memory, dynamic memory, flash memory, cache memory, and/or any non-transitory memory device that stores digital information. The term "module" is used in the description of one or more of the embodiments of elements herein. A module includes one or more processing devices and/or one or more non-transitory memory devices operable to perform one or more functions as may be described herein. A module may operate independently and/or in conjunction with other modules or components and may utilize the processing device and/or memory of other modules and/or operational instructions of other modules. As also used herein, a module may contain one or more sub-modules, each of which may be one or more modules.

As may be used herein, the term "operable to" or "configurable to" indicates that an element includes one or more of circuits, instructions, modules, data, input(s), output(s), etc., to perform one or more of the described or necessary corresponding functions and may further include inferred coupling to one or more other items to perform the described or necessary corresponding functions. As may also be used herein, the term(s) "coupled", "coupled to", "connected to" and/or "connecting" or "interconnecting" includes direct connection or link between nodes/devices and/or indirect connection between nodes/devices via an intervening item (e.g., an item includes, but is not limited to, a component, an element, a circuit, a module, a node, device, network element, etc.). As may further be used herein, inferred connections (i.e., where one element is connected to another element by inference) includes direct and indirect connection between two items in the same manner as "connected to".

Note that the aspects of the present disclosure may be described herein as a process that is depicted as a schematic, a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

The various features of the disclosure described herein can be implemented in different systems and devices without departing from the disclosure. It should be noted that the foregoing aspects of the disclosure are merely examples and are not to be construed as limiting the disclosure. The description of the aspects of the present disclosure is intended to be illustrative, and not to limit the scope of the claims. As such, the present teachings can be readily applied to other types of apparatuses and many alternatives, modifications, and variations will be apparent to those skilled in the art.

In the foregoing specification, certain representative aspects of the invention have been described with reference to specific examples. Various modifications and changes may be made, however, without departing from the scope of the present invention as set forth in the claims. The specification and figures are illustrative, rather than restrictive, and modifications are intended to be included within the scope of the present invention. Accordingly, the scope of the invention should be determined by the claims and their legal equivalents rather than by merely the examples described. For example, the components and/or elements recited in any apparatus claims may be assembled or otherwise operationally configured in a variety of permutations and are accordingly not limited to the specific configuration recited in the claims.

Furthermore, certain benefits, other advantages and solutions to problems have been described above with regard to particular embodiments; however, any benefit, advantage, solution to a problem, or any element that may cause any particular benefit, advantage, or solution to occur or to become more pronounced are not to be construed as critical, required, or essential features or components of any or all the claims.

As used herein, the terms "comprise," "comprises," "comprising," "having," "including," "includes" or any variation thereof, are intended to reference a nonexclusive inclusion, such that a process, method, article, composition or apparatus that comprises a list of elements does not include only those elements recited, but may also include other elements not expressly listed or inherent to such process, method, article, composition, or apparatus. Other combinations and/or modifications of the above-described structures, arrangements, applications, proportions, elements, materials, or components used in the practice of the present invention, in addition to those not specifically recited, may be varied or otherwise particularly adapted to specific environments, manufacturing specifications, design parameters, or other operating requirements without departing from the general principles of the same.

Moreover, reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is intended to be construed under the provisions of 35 U.S.C. § 112(f) as a "means-plus-function" type element, unless the element is expressly recited using the phrase "means for" or, in the case of a method claim, the element is recited using the phrase "step for."

The invention claimed is:

1. A method for determining one or more chunk statistics, comprising:
   identifying a flow in a media session by a monitoring station;
   determining a start of a chunk in the flow by the monitoring station, wherein identifying the start of the chunk in the flow comprises:
      determining packet sizes for a plurality of upstream packets in the flow;
      comparing the packet sizes to a size pattern associated with an average request message;
      determining a first packet of the upstream packets in the flow compares favorably to the size pattern; and
      identifying the start of the chunk using an arrival time of the first packet at the monitoring station;
   determining an end of a chunk in the flow by the monitoring station; and
   determining one or more chunk statistics from the start of the chunk and the end of the chunk in the flow.

2. The method of claim 1, wherein identifying the start of the chunk in the flow further comprises:

determining that the first packet of the plurality of upstream packets in the flow has a packet size within one or more thresholds, wherein the one or more thresholds relate to a minimum size or maximum size of an average request message; and identifying the first packet as a first packet of a request message for the chunk; and determining the start of the chunk in response to the arrival time of the first packet of the request message for the chunk at the monitoring station.

3. The method of claim 2, wherein determining the end of the chunk in the flow by the monitoring station comprises:

identifying a subsequent request message in the flow;

determining a preceding downstream packet, wherein the preceding downstream packet precedes the subsequent request message; and determining the end of the chunk in response to an arrival time of the preceding downstream message for the chunk at the monitoring station.

4. The method of claim 1, wherein determining the one or more chunk statistics comprises:

determining a chunk download time for the chunk by determining a time from the start of the chunk to either the end of the chunk or the arrival time of the last packet of the chunk;

determining a chunk size for the chunk by determining an amount of data transmitted downstream between the start of the chunk and the end of the chunk; and determining a chunk duration for the chunk by determining a difference in time from the start of the chunk and a start of the next chunk in the flow.

5. The method of claim 4, wherein determining the one or more chunk statistics further comprises:

determining a chunk gap for the chunk, wherein the chunk gap equates to at least one of: a difference between the chunk duration of the chunk and the chunk download time for the chunk or a difference between the end of the chunk in the flow and the start of next chunk in the flow.

6. The method of claim 4, wherein determining the one or more chunk statistics further comprises:

determining a chunk throughput for the chunk, wherein the chunk throughput is the chunk size of the chunk divided by the chunk duration of the chunk.

7. The method of claim 6, wherein determining the one or more chunk statistics further comprises:

determining a saturated chunk throughput for the chunk, wherein the saturated chuck throughput is the chunk size of the chunk divided by the chunk download time for the chunk.

8. The method of claim 6, further comprising:

determining a session average throughput, wherein the session average throughput is at least one of:

a sum of the chunk throughput for a plurality of chunks in the media session and the number of the plurality of chunks; or a sum of a total size of the plurality of chunks in the media session divided by the duration of the plurality of chunks in the media session, wherein the duration of the plurality of chunks in the media session equates to a length of the media session.

9. The method of claim 8, further comprising:

determining a session saturated throughput for the media session, wherein the session saturated throughput is one of:

a sum of chunk sizes of the plurality of chunks in the media session divided by a sum of download time for the plurality of chunks; or an average of chunk saturated throughput for the plurality of chunks in the session.

10. The method of claim 8, further comprising:

determining a session throughput gap for the media session, wherein the session throughput gap is a difference between the session saturated throughput and the session average throughput.

11. The method of claim 1, wherein determining the one or more chunk statistics from the start of the chunk and the end of the chunk in the flow occurs in real-time while the monitoring station observes packets in the media session.

12. A station configured to monitor media sessions between a video service and a client device, comprising:

a network interface circuit configured to intercept IP packets in a network; and a processing circuit configured to:

identify a flow of IP packets in a media session between the video service and the client device, wherein the flow of IP packets is encoded into a plurality of chunks and each of the plurality of chucks includes a portion of video content encoded with a designated bitrate for the plurality of chunks;

determine a start of a chunk in the flow of IP packets in the media session;

determine an end of a chunk in the flow of IP packets in the media session; and determine one or more chunk statistics from the start of the chunk and the end of the chunk in the flow, wherein the processing circuit is configured to determine the one or more chunk statistics by:

determining a duration from the start of the chunk and either the end of the chunk or the arrival time of the last packet of the chunk; and determining a chunk download time using the duration.

13. The station of claim 12, wherein the processing circuit is configured to identify the flow of IP packets in the media session between the video service and the client device by:

determining source IP addresses, destination IP addresses and protocols for the intercepted IP packets in the network;

for downstream intercepted IP packets, comparing the source IP addresses with a plurality of stored IP addresses associated with video servers of the video service and the destination IP addresses with an IP address associated with the client device;

for upstream intercepted IP packets, compare the source IP addresses with the IP address associated with the client device and the destination IP addresses with the plurality of stored IP addresses associated with the video servers of the video service; and identify the flow of IP packets in the media session including requests to and responses from the video service and the client device, wherein the flow of IP packets may include a TCP flow or UDP flow.

14. The station of claim 13, wherein the processing circuit is configured to determine the start of the chunk in the flow of IP packets in the media session by;

identifying packet sizes for a plurality of upstream IP packets in the flow;

comparing the identified packet sizes for the plurality of upstream IP packets in the flow to a size pattern associated with an average request message;

determining a first packet of the upstream IP packets in the flow compares favorably to the size pattern associated with the average request message; and identifying the start of the chunk in response to an arrival time of the first packet at the monitoring station.

15. The station of claim 14, wherein the processing circuit is configured to determine the end of the chunk in the flow of IP packets in the media session by:

identifying a subsequent request message in the flow of IP packets in the media session;

determining a preceding downstream packet, wherein the preceding downstream packet precedes the subsequent request message; and determining the end of the chunk in response to an arrival time of the preceding downstream message for the chunk.

16. The station of claim 12, wherein the processing circuit is configured to determine the one or more chunk statistics by:

determining an amount of data transmitted downstream between the start of the chunk and the end of the chunk;

determining the chunk size for the chunk using the amount of data transmitted downstream between the start of the chunk and the end of the chunk; and determining a chunk duration for the chunk, wherein the chunk duration is a difference in time from the start of the chunk and a start of the next chunk in the flow.

17. The station of claim 16, wherein the processing circuit is further configured to determine the one or more chunk statistics by:

determining a chunk gap for the chunk, wherein the chunk gap equates to at least one of: a difference between the chunk duration of the chunk and the chunk download time for the chunk or a difference between the end of the chunk in the flow and the start of next chunk in the flow.

18. The station of claim 17, wherein the processing circuit is further configured to determine the one or more chunk statistics by:

comparing the chunk gap for the chunk to one or more chunk gap thresholds;

determining the chunk gap for the chunk exceeds the one or more chunk gap thresholds; and determining a start time of the chunk;

determining from the start time of the chunk, a set of a plurality of chunks in a steady state in the media session.

19. The station of claim 18, wherein the processing circuit is further configured to:

determine an average download bitrate from the set of the plurality of chunks in the steady state in the media session; and obtain the average playback bitrate for the steady state using the average download bitrate.

20. The station of claim 19, wherein the processing circuit is further configured to:

access a predetermined mapping from a set of known video resolutions to ranges of playback bitrates; and determine a video resolution of the media session from the predetermined mapping and the average playback bitrate.

21. The station of claim 12, wherein station includes a monitoring station having one or more in network detector stations.

22. The station of claim 12, wherein the processing circuit is configured to determine the one or more chunk statistics by:

determining an amount of data transmitted downstream between the start of the chunk and the end of the chunk; and determining the chunk size for the chunk using the amount of data transmitted downstream between the start of the chunk and the end of the chunk.

* * * * *